US010992603B2

(12) United States Patent
Yong et al.

(10) Patent No.: US 10,992,603 B2
(45) Date of Patent: Apr. 27, 2021

(54) BLOCK ACKNOWLEDGEMENT WITH OUT-OF-ORDER PACKETS

(71) Applicant: Apple Inc., Cupertino, CA (US)

(72) Inventors: Su Khiong Yong, Palo Alto, CA (US); Yigal Eliaspur, Cupertino, CA (US); Yong Liu, Campbell, CA (US); Koby Vainapel, Herzliya (IL)

(73) Assignee: Apple Inc., Cupertino, CA (US)

( * ) Notice: Subject to any disclaimer, the term of this patent is extended or adjusted under 35 U.S.C. 154(b) by 2 days.

(21) Appl. No.: 15/981,140

(22) Filed: May 16, 2018

(65) Prior Publication Data
US 2019/0097952 A1 Mar. 28, 2019

Related U.S. Application Data

(60) Provisional application No. 62/564,059, filed on Sep. 27, 2017.

(51) Int. Cl.
| H04W 4/00 | (2018.01) |
| H04L 12/861 | (2013.01) |
| H04L 12/825 | (2013.01) |
| H04W 28/18 | (2009.01) |
| H04L 12/851 | (2013.01) |
| H04L 12/801 | (2013.01) |
| H04W 84/12 | (2009.01) |
| H04L 12/807 | (2013.01) |
| H04L 12/835 | (2013.01) |

(52) U.S. Cl.
CPC ...... *H04L 49/9057* (2013.01); *H04L 47/2483* (2013.01); *H04L 47/26* (2013.01); *H04L 47/34* (2013.01); *H04W 28/18* (2013.01); *H04L 47/27* (2013.01); *H04L 47/30* (2013.01); *H04W 84/12* (2013.01)

(58) Field of Classification Search
CPC ..... H04L 49/9057; H04L 47/30; H04L 47/34; H04L 47/2483
See application file for complete search history.

(56) References Cited

U.S. PATENT DOCUMENTS

| 7,075,891 | B2 | 7/2006 | Hu | |
| 9,585,048 | B2 | 2/2017 | Ozturk | |
| 2008/0267184 | A1* | 10/2008 | Arisoylu | ............... H04L 45/245 370/391 |
| 2011/0235634 | A1* | 9/2011 | Fukuda | ................... H04L 47/34 370/389 |
| 2011/0292945 | A1* | 12/2011 | Yasuda | ................... H04L 45/00 370/394 |
| 2013/0114606 | A1* | 5/2013 | Schrum, Jr. | ........... H04L 45/023 370/395.53 |

(Continued)

*Primary Examiner* — Bo Hui A Zhu
(74) *Attorney, Agent, or Firm* — Kowert, Hood, Munyon, Rankin & Goetzel, P.C.

(57) ABSTRACT

A wireless device can perform Out-of-Order packet processing and block acknowledgement. Multiple packets may be received at a lower layer of the wireless device. Identifying information may be determined for the received packets. It may be determined that the packets were received out of sequential order, based at least in part on the identifying information. Despite being received out of sequential order, payload information from the packets may be provided to a higher layer of the wireless device in a non-sequential order, such as the order of receipt.

20 Claims, 15 Drawing Sheets

(56) References Cited

U.S. PATENT DOCUMENTS

| | | | |
|---|---|---|---|
| 2013/0176939 A1* | 7/2013 | Trainin | H04L 1/1614 370/328 |
| 2015/0333875 A1 | 11/2015 | Zhang | |
| 2017/0019815 A1 | 1/2017 | Yi | |
| 2017/0163391 A1* | 6/2017 | Kimura | H04W 16/14 |
| 2018/0324103 A1* | 11/2018 | Yang | H04W 76/22 |

* cited by examiner

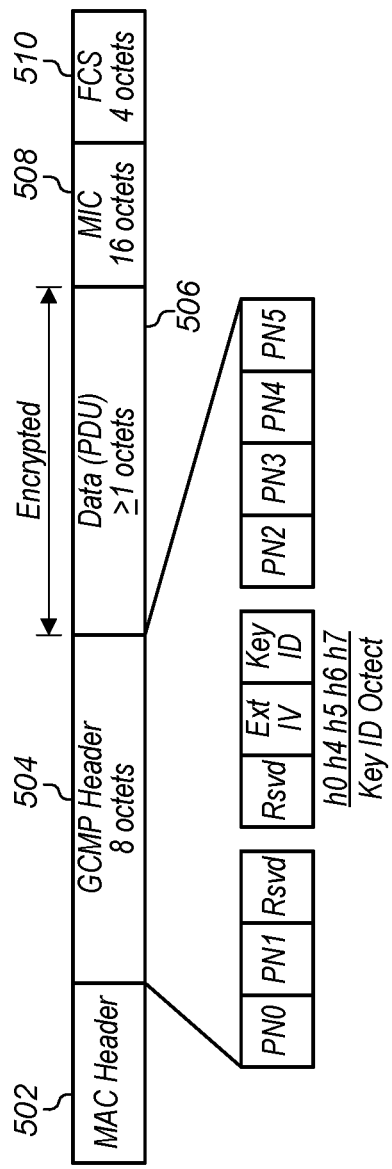
FIG. 5A
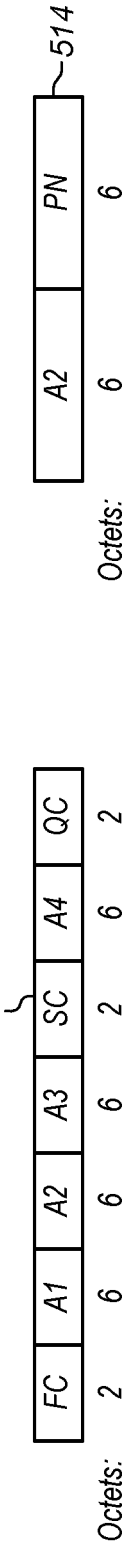
FIG. 5B
FIG. 5C

GCMP Decapsulation Block Diagram 652

BLOCK ACKNOWLEDGEMENT WITH OUT-OF-ORDER PACKETS

PRIORITY CLAIM

This application claims priority to U.S. provisional patent application Ser. No. 62/564,059, entitled "Block Acknowledgement with Out-of-Order Packets," filed Sep. 27, 2017, which is hereby incorporated by reference in its entirety as though fully and completely set forth herein.

FIELD

The present disclosure relates to wireless communication, including to techniques for performing wireless communication with block acknowledgements in systems, such as IEEE 802.11 wireless systems.

DESCRIPTION OF THE RELATED ART

Wireless communication systems are rapidly growing in usage. Additionally, there exist numerous different wireless communication technologies and standards. Some examples of wireless communication standards include GSM, UMTS (WCDMA), LTE, LTE Advanced (LTE-A), 3GPP2 CDMA2000 (e.g., 1×RTT, 1×EV-DO, HRPD, eHRPD), IEEE 802.11 (WLAN or Wi-Fi), Bluetooth, and others.

Many devices implement IEEE 802.11 standards for multiple types of communication. Some types of communication may be more resilient to out-of-order packets than other types. Current implementations of block acknowledgements may require that packets be acknowledged in-order. Such implementations may impose latency on the communications and buffer size requirements on devices. Accordingly, improvements in this domain would be desirable.

SUMMARY

Embodiments described herein relate to a method for performing block acknowledgements for Out-of-Order packets. Communicating devices may set up wireless transmissions, including negotiating various communication parameters. A recipient device may receive data, which may include out-of-order packets. Among other processing tasks, the recipient device may attempt to detect any replayed and/or duplicated packets. The recipient device may provide the data to a higher layer, possibly including providing out-of-order packets to the higher layer without reordering the packets, e.g., to a sequential order.

Such out-of-order block acknowledgement techniques may allow for reduced buffering requirements and/or reduced latency for a wireless device implementing such techniques, e.g., in comparison to in techniques that require in-order processing, at least in some instances.

Additionally, techniques for detecting duplicate and/or replayed packets when implementing an out-of-order block acknowledgement scheme are described herein. Such techniques may help reduce any potential vulnerability of such a scheme to third party attacks, at least according to some embodiments.

The techniques described herein may be implemented in and/or used with a number of different types of devices, including, but not limited to, cellular phones, portable media players, portable gaming devices, tablet computers, wearable computing devices, remote controls, wireless speakers, set top box devices, television systems, and/or computers.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description is considered in conjunction with the following drawings, in which:

FIGS. 5A-5C illustrate exemplary possible media access control (MAC) protocol data unit (MPDU) construction;

Figure 1:
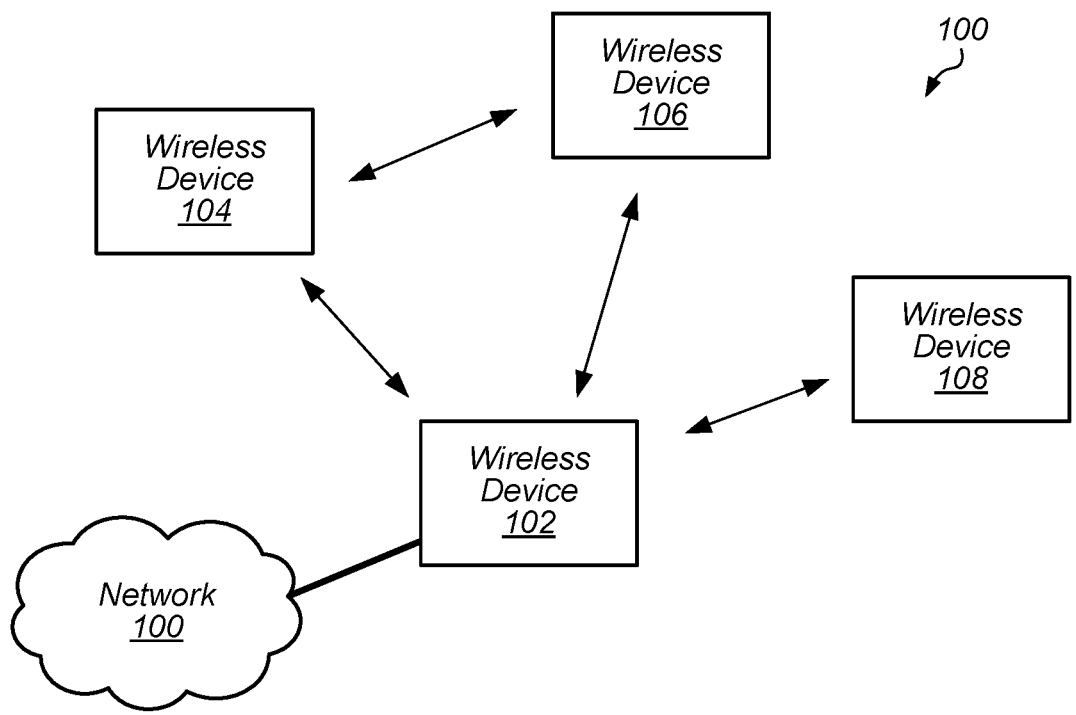
FIGS. 1-2 illustrate exemplary (and simplified) wireless communication systems.

While the features described herein are susceptible to various modifications and alternative forms, specific embodiments thereof are shown by way of example in the drawings and are herein described in detail. It should be understood, however, that the drawings and detailed description are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in the present disclosure:

Memory Medium—Any of various types of non-transitory computer accessible memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic."

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

Station (STA)—any of various types of computer systems or devices that perform wireless communications. A STA can be portable (or mobile) or may be stationary or fixed at a certain location. Examples of STAs include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, or other handheld devices, etc.

Base Station or Access Point (AP)—The term "Base Station" has the full breadth of its ordinary meaning, and at least includes a wireless communication station installed at a fixed location and used to communicate as part of a wireless telephone system or radio system. The term "access point" is used similarly.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

PHY rate or PHY data rate—A rate at which devices communicate with each other over a medium. Many wireless communication technologies (including IEEE 802.11) may provide for the use of different combinations of modulation type, coding rate, numbers of spatial streams, channel widths, and/or other physical layer characteristics. Each such combination may result in (and in some cases, be referred to as) a "PHY rate". The combination of physical layer characteristics which result in a given PHY rate may also be referred to as a "modulation and coding scheme", "MCS", or "MCS index". "Lower" or "more robust" PHY rates/MCS indices may provide receivers with greater capability to successfully receive information being communicated under less-than-ideal medium conditions than "higher" or "less robust" PHY rates (e.g., by using a lower density modulation scheme and/or including a greater proportion of error correction coding information), often at a cost of potential throughput. Higher or less robust PHY rates may, in contrast, provide more efficient medium use and provide greater throughput than lower PHY rates (e.g., by using a higher density modulation scheme and/or including a lesser proportion of error correction coding information), but may be more difficult to receive under less-than-ideal medium conditions.

IEEE 802.11—refers to technology based on IEEE 802.11 wireless standards such as 802.11a, 802.11.b, 802.11g, 802.11n, 802.11-2012, 802.11ac, and/or other IEEE 802.11 standards. IEEE 802.11 technology may also be referred to as "Wi-Fi" or "wireless local area network (WLAN)" technology.

Figure 2:
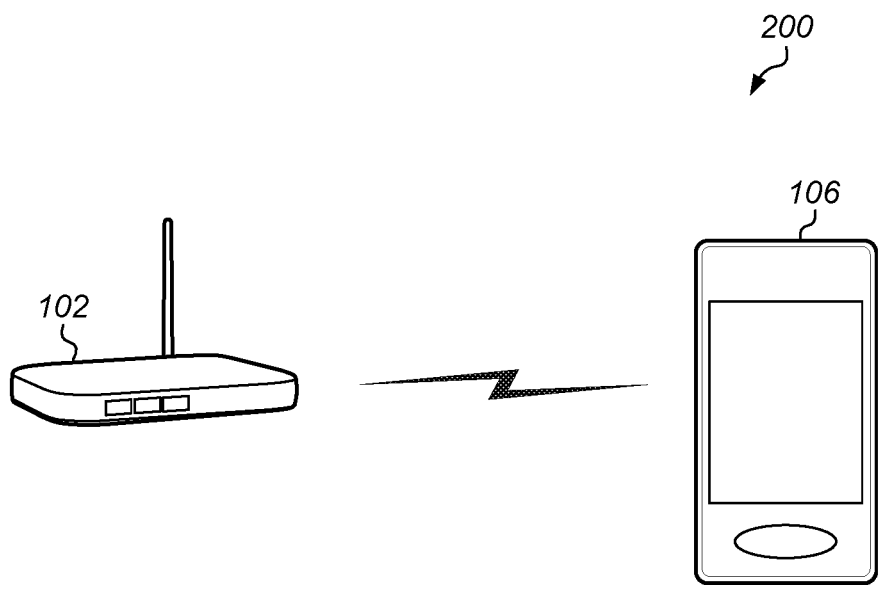

FIGS. 1-2—Communication System

FIG. 1 illustrates an exemplary (and simplified) wireless communication system 100. It is noted that the system 100 of FIG. 1 is merely one example of a possible system, and embodiments may be implemented in any of various systems, as desired. For example, note that although the exemplary wireless communication system 100 illustrated in FIG. 1 is shown as including four wireless devices, aspects of the disclosure may be implemented in wireless communication systems having greater or lesser numbers (i.e., any arbitrary number) of wireless devices.

As shown, the exemplary wireless communication system 100 includes multiple wireless devices 102-108 which communicate over a transmission medium. Some or all of the wireless devices may be substantially mobile devices. Alternatively, or in addition, some or all of the wireless devices may be substantially stationary.

The wireless devices 102-108 may communicate over the wireless transmission medium in such a manner as to form a wireless network. The wireless network may be an IEEE 802.11 'infrastructure mode' network provided by a dedicated access point (e.g., wireless device 102); alternatively, the wireless network may be an 'ad-hoc' or peer-to-peer based network. Note that it may be possible that the wireless network may include one or more 'hidden nodes'; for example, as shown, wireless device 108 may be within communication range of wireless device 102, but may not be able to detect (and/or be detected by) wireless devices 104 and 106. The wireless devices 102-108 may be configured to implement various embodiments described herein.

One or more of the wireless devices may be equipped to communicate with one or more external networks. For example, as shown, wireless device 102 may be communicatively coupled to network 100. The external network(s) may be any of a variety of types of networks, such as a cellular service provider's core network (e.g., via a cellular base station), the Internet, or an organization's intranet, among various possibilities.

Note that one or more of the wireless devices 102-108 may be capable of communicating using multiple wireless communication standards. For example, one or more of the wireless devices 102-108 may be configured to communicate using at least one wireless networking protocol (e.g., Wi-Fi or WLAN) and/or peer-to-peer wireless communication protocol (e.g., BT, Wi-Fi peer-to-peer, etc.) and at least one cellular communication protocol (e.g., GSM, UMTS, LTE, LTE-Advanced (LTE-A), 5G NR, 3GPP2 CDMA2000 (e.g., 1×RTT, 1×EV-DO, HRPD, eHRPD), etc.). Any or all of wireless devices 102-108 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

FIG. 2 illustrates an exemplary wireless communication system 200 in which aspects of the system 100 of FIG. 1 according to one possible implementation are represented. As shown, in the illustrated system wireless device 106 may be a (potentially mobile) station (STA) 106 and wireless device 102 may be an access point 102 (also referred to as an "AP", or alternatively as a "base station" or "BS"). The STA 106 may be a user device with Wi-Fi communication capability such as a mobile phone, a hand-held device, a computer or a tablet, or virtually any type of wireless device. The AP 102 may be an access point device with Wi-Fi communication capability such as a wireless router or other wireless access point, although other embodiments are also envisioned.

Either or both of the AP 102 and the STA 106 may include a processor that is configured to execute program instructions stored in memory. Either or both of the AP 102 and the STA 106 may perform any of the method embodiments described herein by executing such stored instructions. Alternatively, or in addition, a programmable hardware element such as an FPGA (field-programmable gate array) that is configured to perform any of the method embodiments described herein, or any portion of any of the method embodiments described herein, may be included as part of the AP 102 and/or the STA 106.

Figure 3:
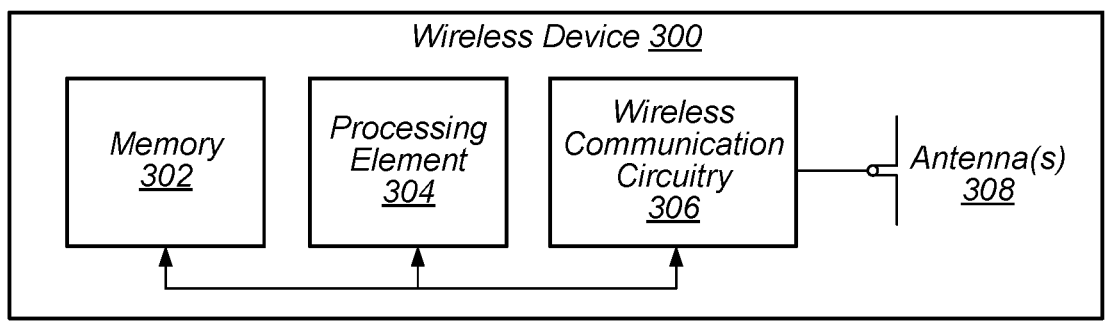
FIG. 3 illustrates a block diagram of an exemplary wireless device.

FIG. 3—Exemplary Block Diagram of a Wireless Device

FIG. 3 illustrates an exemplary block diagram of a wireless device 300 which may be configured for use in conjunction with various aspects of the present disclosure. The device 300 may be any of a variety of types of device and may be configured to perform any of a variety of types of functionality. For example, the device 300 may be a substantially portable device (a mobile device), such as a mobile phone, a personal productivity device, a computer or a tablet, a handheld gaming console, a portable media player, etc. Alternatively, the device 300 may be a substantially stationary device, such as a television, a subwoofer, speaker, or other audio rendering device, a wireless access point, a set-top box, etc., if desired.

As shown, the device 300 may include a processing element 304. The processing element 304 may include or be coupled to one or more local and/or system memory elements, such as memory 302. Memory 302 may include any of a variety of types of memory and may serve any of a variety of functions. For example, memory 302 could be RAM serving as a system memory for processing element 304. Other types and functions are also possible.

The device 300 may also include wireless communication circuitry 306. The wireless communication circuitry 306 may include analog and/or digital circuitry components, and may alternatively be referred to as a 'radio'. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the wireless device 300 may share one or more parts of a receive and/or transmit chain between multiple wireless communication technologies, such as those discussed above. The wireless communication circuitry may include or be coupled to one or more antennas 308.

Note that if desired, the wireless communication circuitry 306 may include a discrete processing element in addition to processing element 304; for example, processing element 304 may be an 'application processor' while wireless communication circuitry 306 may include its own 'baseband processor'; alternatively (or in addition), processing element 304 may provide processing capability for the wireless communication circuitry 306. The device 300 may be capable of communicating using any of various wireless communication technologies by way of wireless communication circuitry 306 and antenna(s) 308.

The device 300 may additionally include any of a variety of other components (not shown) for implementing device functionality, depending on the intended functionality of the device 300, which may include further processing and/or memory elements, one or more power supply elements (which may rely on battery power and/or an external power source), user interface elements (e.g., display, speaker, microphone, camera, keyboard, mouse, touchscreen, etc.), additional communication elements (e.g., antenna(s) for wireless communication, I/O ports for wired communication, communication circuitry/controllers, etc.), and/or any of various other components.

The components of the device 300, such as processing element 304, memory 302, wireless communication circuitry 306, and antenna(s) 308, may be operatively coupled via one or more intra-chip or inter-chip interconnection interfaces, which may include any of a variety of types of interface, possibly including a combination of multiple types of interface. As one example, a USB high-speed inter-chip (HSIC) interface may be provided for inter-chip communications between processing element 304 and wireless communication circuitry 306. Alternatively (or in addition), a universal asynchronous receiver transmitter (UART) interface, a serial peripheral interface (SPI), inter-integrated circuit (I2C), system management bus (SMBus), and/or any of a variety of other communication interfaces may be used for communications between processing element 304, memory 302, wireless communication circuitry 306, and/or any of various other device components. Other types of interfaces (e.g., peripheral interfaces for communication with peripheral components within or external to device 300, etc.) may also be provided as part of device 300.

As described herein, the device 300 may include hardware and software components for implementing various embodiments described herein.

Figure 4A:
FIGS. 4A-4C illustrate exemplary transmissions.
Figure 4B:
Figure 4C:
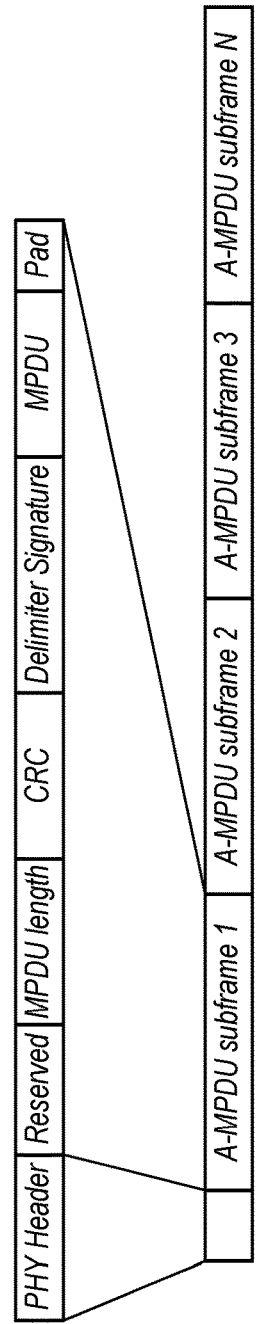

FIGS. 4A-4C—Exemplary Transmissions

FIGS. 4A-4C illustrate exemplary transmission formats for a wireless communication system, such as an IEEE 802.11 wireless communication system.

FIG. 4A illustrates an exemplary un-aggregated packet transmission. As shown, the transmission includes an initial PHY header, a MAC header, one or more data fields, and an FCS (frame check sequence) field. The PHY header may include information such as packet length and/or rate. The MAC header may include information such as destination address and/or duration. The duration field may be used to determine the length of the transmission, e.g., which may be used for calculating the network allocation vector (NAV). The FCS field may include cyclic redundancy check (CRC) information that may be used to verify accurate reception of the transmission (e.g., the duration and destination address).

FIG. 4B illustrates an exemplary burst transmission. In this transmission, an initial RTS (request to send) may be transmitted from the transmitter to the receiver. The MAC header in the RTS may indicate the length of the burst via the duration field. After the RTS is transmitted, the receiver may respond with a CTS (clear to send), after which the transmitter may send its burst of packets, shown as "1", "2", "3", "N" in FIG. 4B. After this burst of packets, the receiver may respond with a block acknowledgement (BA).

FIG. 4C illustrates an exemplary aggregated transmission, in this case an aggregated MPDU (MAC protocol data unit), which may be referred to as an "AMPDU". As shown, in an AMPDU, multiple Ethernet frames for a common destination are aggregated and sent as a burst. As shown in this aggregation, an AMPDU subframe includes MPDU length information as well as CRC information (which may be used to ensure proper reception of the MPDU), among other information.

As described herein, the exemplary transmission formats illustrated in FIGS. 4A-4C, and/or variations thereof, may be used in conjunction with various embodiments described herein, e.g., including techniques for out-of-order packet processing.

FIGS. 5 and 6—Galois Counter Mode Protocol (GCMP) Operation in IEEE 802.11ad/ay FIGS. 5 and 6 depict the operation of an encryption/decryption scheme known as Galois Counter Mode Protocol (GCMP) in IEEE 802.11 systems. GCMP may be an authenticate-and-encrypt block cipher approach. GCMP may require a new temporal key (TK) for every communication window/session and a unique nonce value for each frame. The nonce may include a 48-bit packet number (PN) for this purpose. At least according to some embodiments, reuse of a PN during a communication window may void security. Similarly, each transmission (e.g., packet) may include a sequence number (SN) and a repeated SN may indicate a duplicate transmission. Thus, methods may be implemented to detect repeated PN or SN values.

FIG. 5A depicts a possible MPDU format when using GCMP, e.g., in embodiments of IEEE 802.11ad/ay systems. The MPDU may include a MAC header 502, as well as a GCMP Header 504 that may be constructed from PN key identifier (Key ID) subfields. The 48-bit PN may be represented as 6 octets (e.g., PN0-PN5). The MPDU may also include fields for data (506), message integrity code (MIC) (508), and FCS (510). Data field 506 may be encrypted.

FIG. 5B depicts construction of possible additional authenticated data (AAD) for GCMP. AAD may be constructed based on the header of an MPDU, at least according to some embodiments, e.g., as discussed in more detail with respect to FIG. 6A below. The AAD construction algorithm may provide protection for fields included in the AAD. In some embodiments of IEEE 802.11ad/ay systems, fields that may change when retransmitted (e.g., SN, which may be included in the sequence control {SC} subfield 512) may be masked to 0, e.g., in the case of IO processing. In the case of out-of-order (OOO) processing, the unmasked SN may be used. The TID may be included in the QC field.

FIG. 5C depicts an example nonce construction, which may include 12 octets, e.g., for GCMP. The nonce may include an MPDU address field (e.g., Address 2 or A2) and a PN field 514.

Figure 6A:
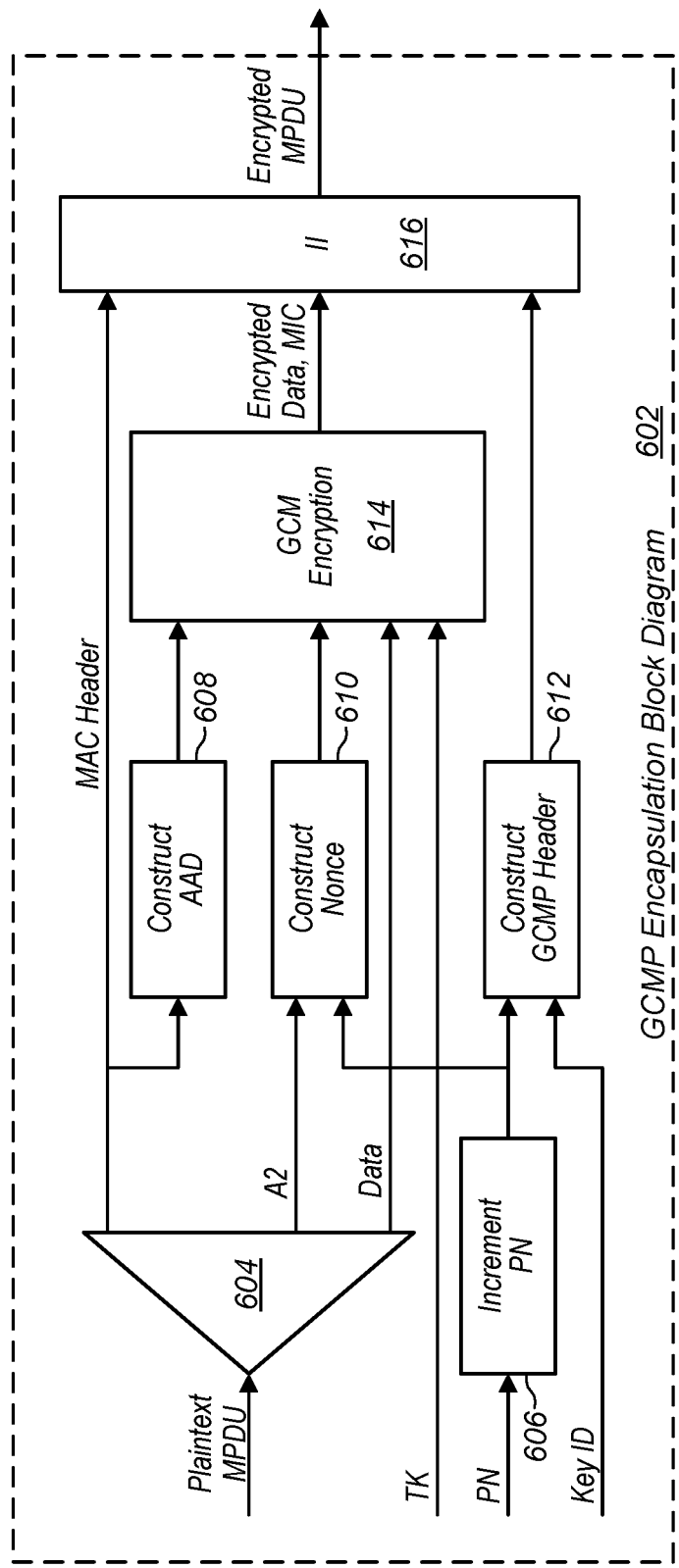
FIGS. 6A-6B illustrate exemplary possible encapsulation and decapsulation schemes.

FIG. 6A depicts an exemplary possible GCMP encapsulation operation, e.g., as may be performed by a device originating an IEEE 802.11 transmission. GCMP may encapsulate a frame body field of a plaintext MPDU to create a cipher as shown in GCMP encapsulation block 602. The plain text MPDU may be separated into components (604). The PN may be incremented (606) so that a new PN is used for each MPDU, e.g., so that no PN is repeated during a session. The AAD may be constructed (608) using fields in the MPDU header (e.g., as shown in FIG. 5B). The nonce may be constructed (610) using fields A2 and PN (e.g., as shown in FIG. 5C). The GCMP header may be constructed (612) from the PN and key identifier. Encryption may be performed (614) using the temporal key (e.g., TK), nonce, AAD and data, resulting in encrypted data (e.g., cipher text) and message integrity code (e.g., MIC). This step may be considered originator processing. The original MAC header, GCMP header, encrypted data, and MIC may be combined (616) to form the encrypted MPDU, which can be sent to the recipient device.

Figure 6B:
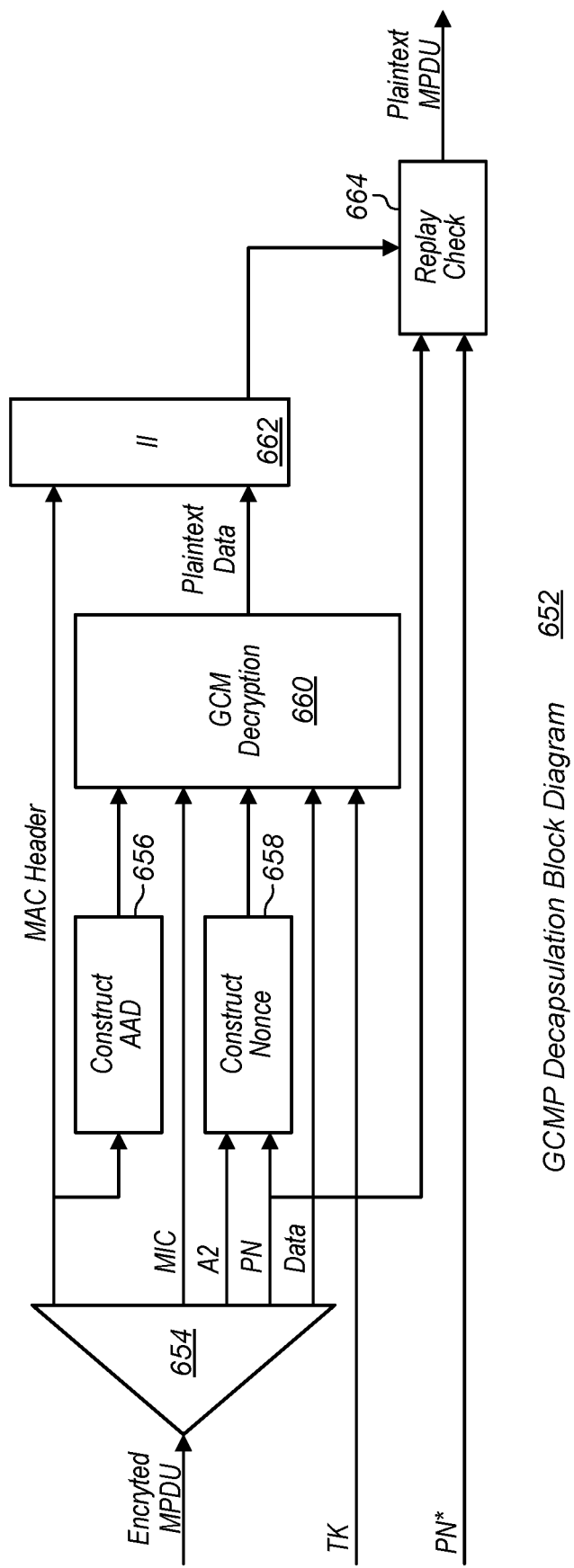

FIG. 6B depicts an exemplary possible GCMP decapsulation and replay check operation, e.g., as may be performed by a device receiving an IEEE 802.11 transmission. Decapsulation block 652 depicts the decapsulation process of a received encrypted MPDU. According to the exemplary process, the MPDU may be parsed to separate MAC header, AAD, MIC, A2, PN, and data (654). The AAD may be constructed (656). The nonce may be constructed (658). The recipient may use the TK, AAD, nonce, data, and MIC to recover the plaintext data (660). The recipient may also check the integrity of AAD and data. The plaintext data and header may be combined to form the unencrypted MPDU (662). The replay check may check whether (e.g., validate that) the PN is greater than the replay counter (e.g., a counter for tracking received packet numbers during a communication, e.g., within a TK value) for the window (664). The plaintext MPDU may be passed to a higher layer of (e.g., a higher network layer implemented by) the recipient device.

As described herein, the exemplary encryption/decryption scheme illustrated in FIGS. 5A-5C and 6A-6B, and/or variations thereof, may be used in conjunction with various embodiments described herein, e.g., including techniques for out-of-order packet processing.

Figure 7:
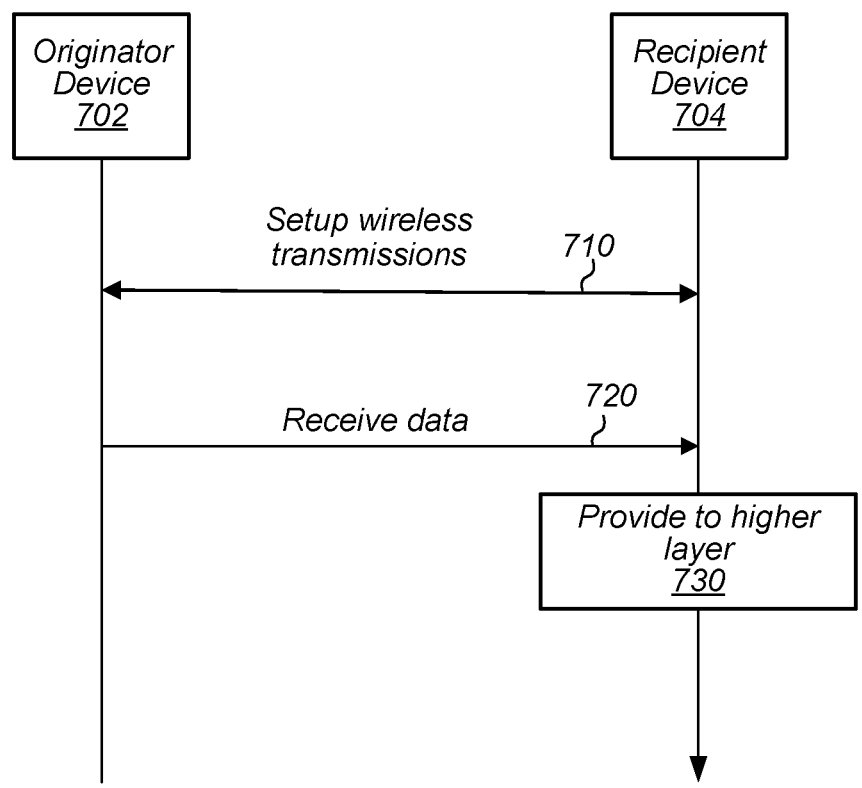
FIG. 7 illustrates exemplary techniques for block-acknowledgement with out-of-order packets.

FIG. 7—Communication Flow Diagram with Out-of-Order Processing

Block acknowledgement schemes may allow for participating devices to efficiently indicate which packets have been, or have not been, successfully received. Thus, block acknowledgement schemes may offer benefits including efficient use of device and network resources. However, at least some existing block acknowledgement solutions may have no flexibility to deliver out-of-order packets to the application layer. As a result, existing block acknowledgement solutions may have relatively large buffering requirements and latency, e.g., since packets received out-of-order must wait for any gaps to be filled or for missing packets to time out. In contrast, out-of-order block acknowledgement techniques may have reduced buffering requirements and/or reduced latency, at least in some instances.

Note, though, that in order to protect against various attacks (e.g., man-in-the-middle attacks, among other possibilities) that may interfere with wireless communications, detection of duplicate or replayed packets may be an important safeguard. Detection of duplicate or replayed packets may require different (and/or additional) techniques in out-of-order schemes relative to in-order approaches.

Accordingly, FIG. 7 is a communication/signal flow diagram illustrating a scheme for providing block acknowledgements and performing replay detection for out-of-order packets such that received packets can be provided to higher layers out-of-order. The scheme may be used for performing wireless communication in a wireless communication system, such as an IEEE 802.11 wireless communication system, according to some embodiments. In various embodiments, some of the elements (or operations) of the methods shown may be performed concurrently, in a different order than shown, may be substituted for by other method elements, or may be omitted. Additional method elements may also be performed as desired.

Aspects of the method of FIG. 7 may be implemented by a wireless device, such as the devices 102-108 and/or device 300 illustrated in and described with respect to FIGS. 1-3, or more generally in conjunction with any of the computer systems or devices shown in the Figures, among other devices, as desired. Note that while at least some elements of the method of FIG. 7 are described in a manner relating to the use of communication techniques and/or features associated with IEEE 802.11 specification documents, such description is not intended to be limiting to the disclosure, and aspects of the method of FIG. 7 may be used in any suitable wireless communication system, as desired. As shown, the method may operate as follows.

The scheme may be used to receive packets in a manner that allows for processing and/or block acknowledgement (BA) of out-of-order packets, and may therefore reduce latency and buffering requirements relative to schemes that require in-order packets. Each of originator 702 and recipient 704 (e.g., receiver 704) may be similar to devices 102-108 and/or device 300 as illustrated in FIGS. 1-3 and described above. The devices may include all or part of a wireless communication system such as wireless communication system 100 or 200 as illustrated in FIGS. 1-2 and described above.

The originator 702 and recipient 704 may exchange one or more transmissions to setup wireless communications for a communication window (710). These transmissions may be referred to as a setup phase.

During the setup phase, the two devices may negotiate a variety of parameters. For example, they may determine a traffic identifier (TID) for the communication session. In some embodiments, multiple TIDs may be employed concurrently. The TID may indicate a class of traffic that is being communicated, according to some embodiments. Some TIDs may be associated with types of traffic that are (e.g., negotiated or pre-agreed to be) eligible for (e.g., suitable or appropriate for, or otherwise associated with) OOO processing. For example, some applications may be able to process OOO packets to be presented to the user without compromising (or with minimal/acceptable impact to) user experience. According to some embodiments, at least some applications that do not rely on Transmission Control Protocol/Internet Protocol (TCP/IP) may be capable of handling OOO packets. For example, some such applications could include ones that provide video phase alternating line (PAL) data directly to the link layer or video applications that provide user datagram protocol (UDP) or UDP/IP to the link layer.

Other TIDs may be associated with types of traffic that are (e.g., negotiated or pre-agreed to be) ineligible for OOO Processing (e.g., OOP) and that may instead be processed using in order (IO) processing. For example, TIDs associated with in order processing may be used for at least some applications that use TCP, among other possibilities.

During the setup phase, the devices may also determine a block acknowledgement (e.g., an acknowledgement for multiple packets) policy. For example, a block acknowledgement (e.g., block ack or BA) policy may specify when a block acknowledgement may be used. Further, such a policy may specify under what circumstances a block acknowledgement may acknowledge OOO packets and how skipped or missed packets may be indicated. Different block acknowledgement policies may be used for IO traffic streams relative to OOO TIDs, at least in some instances. For example, as one possibility, a block acknowledgment policy for IO packets may require the recipient device to hold frames in the reorder buffer until gaps in the sequence number (SN) are filled and to reorder the held frames (e.g., in sequence) before passing them on to the upper layer once the missing frames are received. Thus, in the case of such a policy, an additional amount of latency may be introduced when missing packets occur. In particular, an application may have to wait until the missing frames are received, retransmission timeout occurs, or the missing frame's (or frames') lifetime expires, e.g., before any frames with later sequence numbers are provided to the application. An expired lifetime may indicate that the frame is no longer useful to the recipient, e.g., because that portion of sound or video has already been presented to the user, among various possibilities. This latency may impact user experience, e.g., especially for latency sensitive applications (e.g., video applications, according to some embodiments). Various embodiments comprise alternative block acknowledgement policies for OOO communications.

As another possibility, during the setup phase, the devices may determine buffer size requirements. Buffer size may be set separately for the sending device (e.g., originator 702) and the receiving device (e.g., 704), if desired. The buffer size requirements may depend on any of a variety of factors, potentially including the block acknowledgement policy. For example, the recipient device may require a buffer size capable of holding a number of frames/packets equal to the window size, (e.g., in the case of IO traffic).

As yet another possibility, during the setup phase, the devices may determine a starting sequence number (SSN).

The SSN may be used for the first data transmission (e.g., MPDU, AMPDU, packet, etc.) in the communication window.

During the setup phase, the devices may also or alternatively determine various other parameters, including encryption techniques, replay counters (Rc), and/or temporal keys (TK) to be used for the communication window.

During the setup phase, the originator 702 may check the TID of the traffic/stream, determine if the TID is eligible for OOO packet processing, and verify whether the Recipient 704 is capable of handling OOO packet processing. Recipient 704 may make an analogous determination, e.g., of originator 702.

The recipient 704 may receive data from originator 702 (720). The data may include one or more MPDUs or AMPDUs. As described above, an AMPDU may include a plurality of MPDUs, e.g., that may be transmitted together as a burst. Each MPDU may include at least one MAC service data unit (MSDU), a sequence number (SN), and a packet number (PN). The PN may be included in the header of each MPDU and the SN may be included in the AAD, according to some embodiments. The MSDU may follow the header.

The data may be encrypted according to Counter Mode Cipher Block Chaining Message Authentication Code Protocol (CCMP) or Galois Counter Mode Protocol (GCMP), or according to any other selected encryption technique. As one possibility, the data may be encrypted and encapsulated generally as shown in FIG. 6A. As another possibility, the data may be encrypted and encapsulated in a manner similar to the manner shown in FIG. 6A, but with the SN field not masked to 0. According to some embodiments, the use of an unmasked SN may signal to a recipient that reordering of MSDUs in the recipient's buffer is not required and that the recipient may forward any complete MSDUs to a higher layer of the recipient device (e.g., even out of sequential order) for processing in the order they are received. In other words, an unmasked SN may be used in the case of OOO processing, at least in some embodiments.

The data as received may differ from the data as transmitted, e.g., due to channel conditions, receiver activities, and/or any of various other possible considerations. For example, some packets may not be received (e.g., may be missing), and/or some packets may be received with errors that cause the recipient to be unable to successfully receive and process them. Received packets may be considered to be OOO based on missing or otherwise unsuccessfully received packets, according to some embodiments. For example, if packets are received in monotonically increasing order of sequence number (e.g., SNs 1, 2, and 4), but one or more SNs is missing (e.g., SN 3), then the packets received following the missing packet (e.g., SN 3) may considered OOO (e.g., SN 4). Similarly, retransmitted frames (e.g., frames previously transmitted for which the originator 702 has not received an acknowledgement or BA from recipient 704) may be considered OOO if one or more frames with higher sequence numbers were previously successfully received. At least in some instances, retransmitted MPDUs may not be modified during retransmission (e.g., the PN and the SN may be reused from the original transmission). In the case of IO processing, once a previously missed frame (e.g., SN 3, in the previous example) is successfully received as a retransmitted frame, related frames (e.g., with sequentially higher sequence numbers) may be processed along with the retransmitted frame and the re-ordered frames may be provided to higher layers. Alternatively, in the case of OOO processing (OOP), frames may be provided to higher layers as they are received, e.g., regardless of their relative sequence numbers (e.g., provided they pass a replayed packet check).

Upon receiving the data, recipient 704 may engage in various data processing tasks, including OOO processing, IO processing, decryption, decapsulation, and replay checks (e.g., including either or both of OOO or IO replay checks), among other possibilities. For example, decryption, decapsulation, and replay checks may be performed as shown in FIG. 6B, as one possibility. One function of the data processing (e.g., of a replay check) may be to detect duplicate frames (e.g., frames that have previously been successfully received by recipient 704, but that the originator 702 has nonetheless re-transmitted, for example due to not successfully receiving an acknowledgement provided by the recipient 704), and/or to detect the difference between legitimate, retransmitted frames (e.g., from the authenticated transmitter) and replayed frames (e.g., from an interloper). Examples are provided subsequently herein that are intended to be illustrative of various possible replay check techniques. Note that some processes may apply to both IO processing and OOO processing, others may apply only to one or the other. Note also that, at least according some embodiments, IO processing and OOO processing may be implemented together, if desired. For example, IO processing may be used for some TIDs, and OOO processing may be used for other TIDs, as one possibility. Note still further that any number of additional or alternative replay check techniques, or variations on the techniques described herein, are also possible.

In some embodiments, the Recipient 704 may maintain a separate replay counter per TID for each pairwise transient key security association (PTKSA), group temporal key security association (GTKSA) and station-to-station link transient key security association (STKSA), e.g., for each communication window and associated temporal key. The replay counter (Rc) may be initialized to 0 when the receiver resets the temporal key. The Rc may be set to the PN value of the accepted GCMP MPDUs, e.g., as they are processed. In other words, the Rc may track the highest accepted PN value for the temporal key, and may be updated as higher PN values are accepted.

Recipient 704 may use the PN from the received frame to detect replayed frames (e.g., in the case of IO processing, when PN from received frame<=current Rc value). Detected replayed frames may be discarded by the receiver. In some embodiments, the receiver 704 may discard MSDUs/MPDUs whose PN values are not incrementing in steps of 1. For MSDUs or A-MSDUs sent using the block ack feature, reordering of received MSDUs or A-MSDU according to the block ack receiver operation may be performed prior to the replay detection, e.g., if desired.

Recipient 704 may maintain a scoreboard to track which MPDUs have been received correctly and may prepare a BA response by converting the scoreboard to a bitmap. For example, upon receiving data, the recipient 704 may update the scoreboard based on the SNs of the MPDUs received and create and transmit a BA message to originator 702. The BA message may indicate the SNs of the MPDUs received. The BA may respond to a BA request (BAR) received with the data or separately.

Recipient 704 may maintain a BA record. The BA record may include fields such as originator address, TID, and record of reorder buffer size. The BA record may be indexed by received MPDU sequence control value (e.g., SN).

Recipient 704 may maintain a reorder buffer. In the case of IO processing, this buffer may hold frames until gaps in the sequence number order are filled. Recipient 704 may reorder those held frames, e.g., in ascending sequence number order, as missing frames that fill gaps in the reorder buffer are received. Additionally, recipient 704 may discard held frames if complete MSDUs cannot be reconstructed (e.g., after exceeding a retries limit) or upon detecting that the lifetime of a frame has expired, e.g., to flush the reorder buffer to avoid overflow.

In the case of IO processing, decryption, decapsulation, and replay check may proceed as shown in FIG. 6B, as one possibility. Any number of other IO processing, decryption, decapsulation, and/or replay check techniques may alternatively be used, if desired.

In the case of OOO processing, decryption, decapsulation, and replay check may proceed as shown in FIG. 6B, with various differences, according to some embodiments. For example, decryption may be performed differently, and/or replay detection may be performed based on an OOP Replay Check block/module such as described below. No reordering of MPDUs may be required (e.g., successfully received MSDUs may be forwarded to an upper layer in the order received, even if that order is not sequential). Any number of other OOO processing, decryption, decapsulation, and/or replay check techniques may alternatively be used, if desired.

An OOP Replay Check may differ from an IO replay check in any of various possible ways, e.g., including any of the following ways, among other possibilities. An SN (e.g., instead of setting all to "0") may be used in the AAD construction, as one possibility. As another possibility, recipient 704 may construct a lookup table that maintains {SN, PN} pairs for each successfully received packet and perform a range search in sequential order. As a still further possibility, recipient 704 may construct a lookup table that maintains {SN, PN} pairs for each successfully received packet and perform a brute-force search in sequential order.

In some embodiments, in order to overcome the replay attack issue when received MSDU/A-MSDU reordering is not in use (e.g., in OOO processing), the following modifications may be made. As noted previously herein, in the encryption operation, the originator 702 may use the SN (e.g., versus masking it to 0 as in some implementations of IEEE 802.11ad/ay) as part of the AAD construction. The use of SN in AAD construction may signal (e.g., in addition to or instead of a TID designated for OOP) that the reordering of MSDU in sequence is not required and the recipient 704 may forward any complete MSDU (e.g., even if not in sequential order) to the upper layer for processing. Originator 702 may encrypt the MPDU as per Clause 12.5.5.3, IEEE 802.11-2016 (e.g., among other possibilities) with the exception of using the unmasked SN. In the decryption operation, the recipient 704 may determine whether the session is operating using OOO or IO packet processing. Further, the recipient 704 may use the same SN (e.g., unmasked SN) to construct an AAD, for OOO packet processing. Recipient 704 may decrypt the encrypted MPDU per Clause 12.5.5.4, IEEE 802.11-2016 (e.g., among other possibilities) with the exception of the unmasked SN. Recipient 704 may check that the SN is not duplicated and is monotonically increasing for all MPDUs coming in for all TIDs.

As one possibility, the OOP replay check may operate as follows. Recipient 704 may define a PN table (e.g., a receive reordering buffer or RRB) of a desired size WinSize (PNarray[WinSize]) that stores PNs at positions SN mod WinSize, and may also store a WinStart value (e.g., an initial value of the current window), a MaxPN value (e.g., the maximum PN value encountered so far), and a MinPN value (e.g., the minimum PN value encountered so far, within the current window). Additionally, the recipient 704 may maintain a bitmap of WinSize bits, in which ones may indicate positions for which the PNarray is valid. A "sorted with holes" property may be maintained for the array. PNs for valid locations in the array may always be sorted in increasing order. When inserting a new PN, the operation may find the next and previous valid PNs, and verify that the new PN value is between them. For example, the following operations may be performed.

Given a new sequence number and packet number pair {SN, PN}:

If SN<WinStart: this packet may be dropped (in some instances, this may typically have already been done in a previous operation).

If WinStart≤SN<WinStart+WinSize (e.g., if the packet is within the current window):
    If bitmap[SN] is 1, determine that the packet is a replayed packet.
Otherwise:
    Perform scan(SN,PN). If no replay is detected:
    Set PNarray[SN]=PN, bitmap[SN]=1.
If SN≥WinStart+WinSize, then move the window as follows:
    If PN≤MaxPN, determine that the packet is a replayed packet. Otherwise:
    Set bitmap[k]=0 for each WinStart≤k<SN−WinSize
    Perform scan(SN,PN). If no replay is detected:
    Set PNarray[SN]=PN, bitmap[SN]=1

Additionally, if no replay is detected, the MaxPN value and/or MinPN may be updated as appropriate, e.g., based on the valid PN value just added to the PNarray.

As one possibility, the scan(SN,PN) operation referred to in the previously described operations may be defined as follows:

Scan the bitmap backwards from SN-1 to WinStart until encountering bitmap[k]==1. If PNarray[k]≥PN, determine that the packet is a replayed packet. In other words, if a previously encountered {SN, PN} pair that has a lower SN than the new {SN, PN} pair also has a PN that is greater than or equal to the PN of the new {SN, PN} pair, determine that the packet is replayed. If no such {SN, PN} pair is found, determine that the packet is a replayed packet if the PN of the new {SN, PN} pair is less than a minimum PN value, e.g., if PN≤MinPN.

In addition to the backward scan, scan the bitmap forward from SN+1 to WinStart+WinSize−1 till encountering bitmap[k]==1. If PNarray[k]≤PN, determine that the packet is a replayed packet. In other words, if a previously encountered {SN, PN} pair that has a higher SN than the new {SN, PN} pair also has a PN that is less than or equal to the PN of the new {SN, PN} pair, determine that the packet is replayed. If neither the forward nor the backward scan reveal a replayed packet, then the packet may be accepted as valid.

Thus, by utilizing a packet's SN as an additional input, such a technique may be able to perform the replayed packet detection based on relatively computationally efficient bitmap scan operations, at least according to some embodiments.

As another possibility, a range search in sequential order may be employed as an OOP replay check. In such a case, recipient 704 may arrange ordered pairs of sequence number and packet number for previously received valid packets in ascending order by sequence number. One or more possible sequence number range and packet number range pairs may be determined. Each sequence number range and packet number range pair may be defined to include a possible sequence number range and a corresponding possible packet number range, which may be denoted $\{[SN_{\{r,L\}}, SN_{\{r,H\}}], [PN_{\{r,L\}}, PN_{\{r,H\}}]\}$, within which a valid packet may be found. In this notation, $SN_{\{r,L\}}$ and $SN_{\{r,H\}}$ may correspond to the lowest and highest SN values in the $r^{th}$ range, while $PN_{\{r,L\}}$ and $PN_{\{r,H\}}$ may correspond to the lowest and highest PN values in the $r^{th}$ range. A given received packet with packet number $PN_m$ and sequence number $SN_n$ may be denoted as a paired index as $\{SN_n, PN_m\}$. A maximum number of ranges recorded within a configured window size may be denoted as $R_H$.

For each received packet, then, the recipient 704 may determine whether the sequence number of the packet is in the sequence number range and the packet number of the packet is in the packet number range for any of the determined sequence number range and packet number range pairs. If the sequence number of the packet is in the sequence number range and the packet number of the packet is in the packet number range for a determined sequence number range and packet number range pair, the recipient 704 may determine that the packet is a valid packet.

However, if there is no determined sequence number range and packet number range pair for which the sequence number of the packet is in the sequence number range and the packet number of the packet is in the packet number range, the recipient 704 may determine that the packet is invalid. For example, in this case, the packet may be a replayed packet, or possibly a duplicate packet (though duplicate packets may have been detected in a previous processing step, according to some embodiments).

As a further possibility, a windowed range search may be employed as an OOP replay check. In such a case, recipient 704 may arrange ordered pairs of sequence number and packet number for previously received valid packets in ascending order by sequence number. In at least some instances, an A-MPDU window size array may be maintained, where each instance of the array may contain a field for the sequence number of a received packet, the packet number of that received packet, the largest SN in this BA window (denoted as i) that is smaller than this SN and was already received, and the smallest SN in this BA window (denoted as j) that is larger than this SN and was already received. If the received packet has the same sequence number as any previously received (e.g., valid) packet, it may be determined that the received packet is an invalid (e.g., duplicate) packet. If the received packet does not have the same sequence number as any previously received (e.g., valid) packet, and if the packet number of the packet is both greater than the packet number corresponding to a largest sequence number in the current window that is smaller than the sequence number of the packet and less than a packet number corresponding to a smallest sequence number in the current window that is larger than the sequence number of the packet (e.g., if SN[SN[k].i].PN<SN[k].PN<SN[SN[k].j].PN is true), it may be determined that the received packet is a valid packet. Otherwise, if the packet number of the packet is not both greater than the packet number corresponding to the largest sequence number in the current window that is smaller than the sequence number of the packet and less than the packet number corresponding to the smallest sequence number in the current window that is larger than the sequence number of the packet (e.g., if SN[SN[k].i].PN<SN[k].PN<SN[SN[k].j].PN is not true), it may be determined that the received packet is an invalid (e.g., replayed) packet. Invalid (e.g., duplicated or replayed) frames may be dropped, while the stored {SN, PN} paired indexes may be updated for each valid frame. Note that in case SN[k].i is pointing to the beginning of the window, window start PN may be used, e.g., instead of SN[SN[k].i].PN. Also or alternatively, in case SN[k].j is pointing to the end of the window, no upper bound comparison may be performed (e.g., SN[k].PN may not be compared with SN[SN[k].j].PN).

As yet another possibility, a brute-force search in sequential order may be employed as an OOP replay check. In such a case, recipient 704 may arrange ordered pairs of sequence number and packet number for previously received valid packets in ascending order by sequence number. K may represent the maximum number of the paired index, while $PN_m$ may denote the PN of the received packet along with $SN_n$ denoting the SN of the received packet, such that their paired index may be denoted as $\{SN_n, PN_m\}$. For each packet, if the sequence number is the same as a sequence number of any previously received valid packet within the current window (e.g., for k=1:K, if $SN_k \neq SN_n$ is not true, e.g., if $SN_k = SN_n$ is true for some packet k), the packet may be determined to be an invalid (e.g., duplicate) frame. Similarly, if the packet number is the same as a packet number of any previously received valid packet within the current window (e.g., for k=1:K, if $PN_k \neq PN_m$ is not true, e.g., if $PN_k = PN_m$ is true for some packet k), the packet may be determined to be an invalid (e.g., replayed) frame. Otherwise, if the sequence number of the packet is different from a sequence number of every previously received valid packet within a current window and if a packet number of the packet is different from a packet number of every previously received valid packet within the current window (e.g., for k=1:K, if $SN_k \neq SN_n$ is true, and $PN_k \neq PN_m$ is true), the packet may be determined to be a valid packet.

For packets that are determined to be valid, the packet payload information (e.g., the MSDU encapsulated within a MPDU) may be forwarded/provided to a higher layer (e.g., an application layer, possibly by way of a network layer and/or any other intermediate layers), e.g., for further processing.

Figure 8:
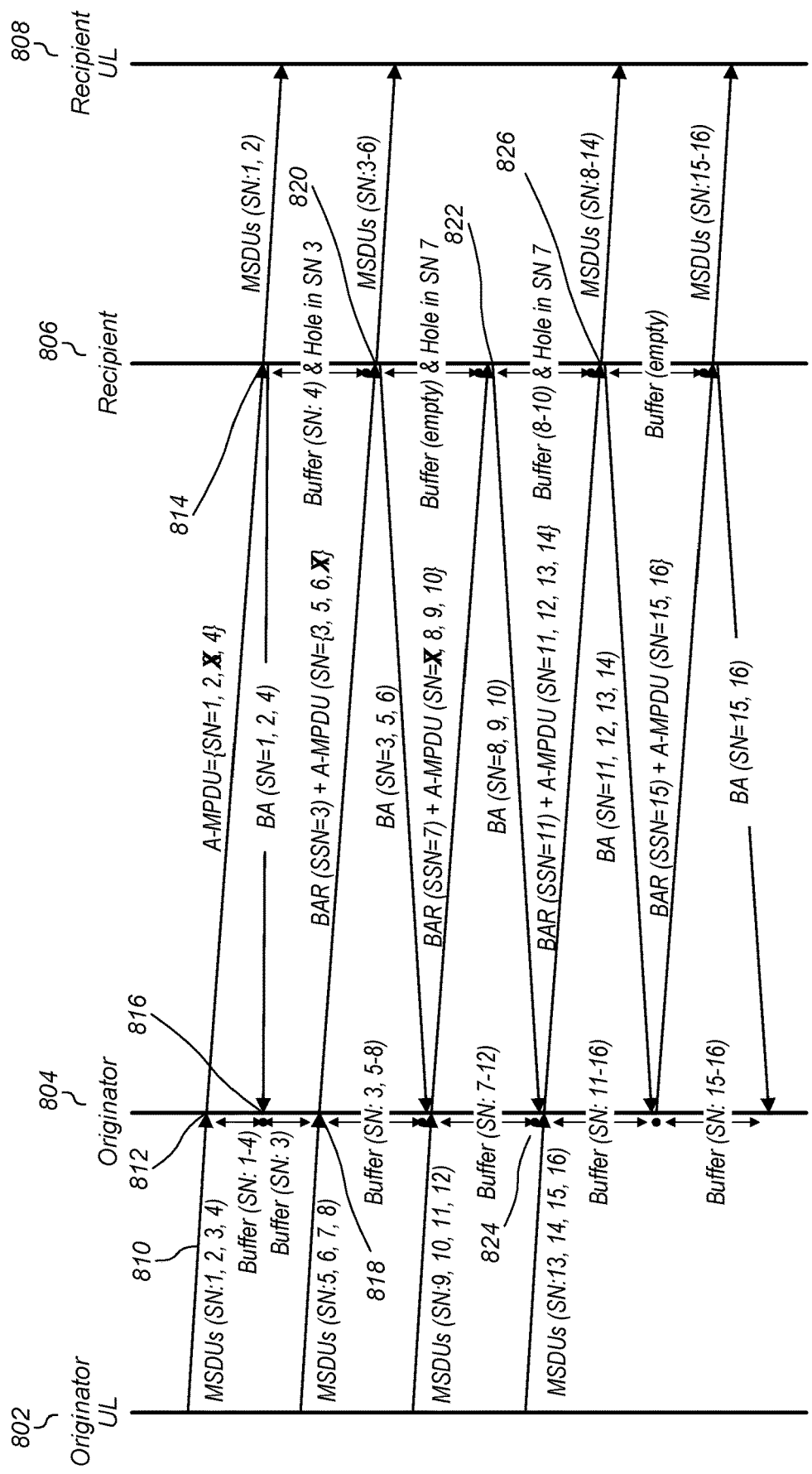
FIGS. 8-11 illustrate exemplary possible communication and block-acknowledgement sequences.
Figure 9:
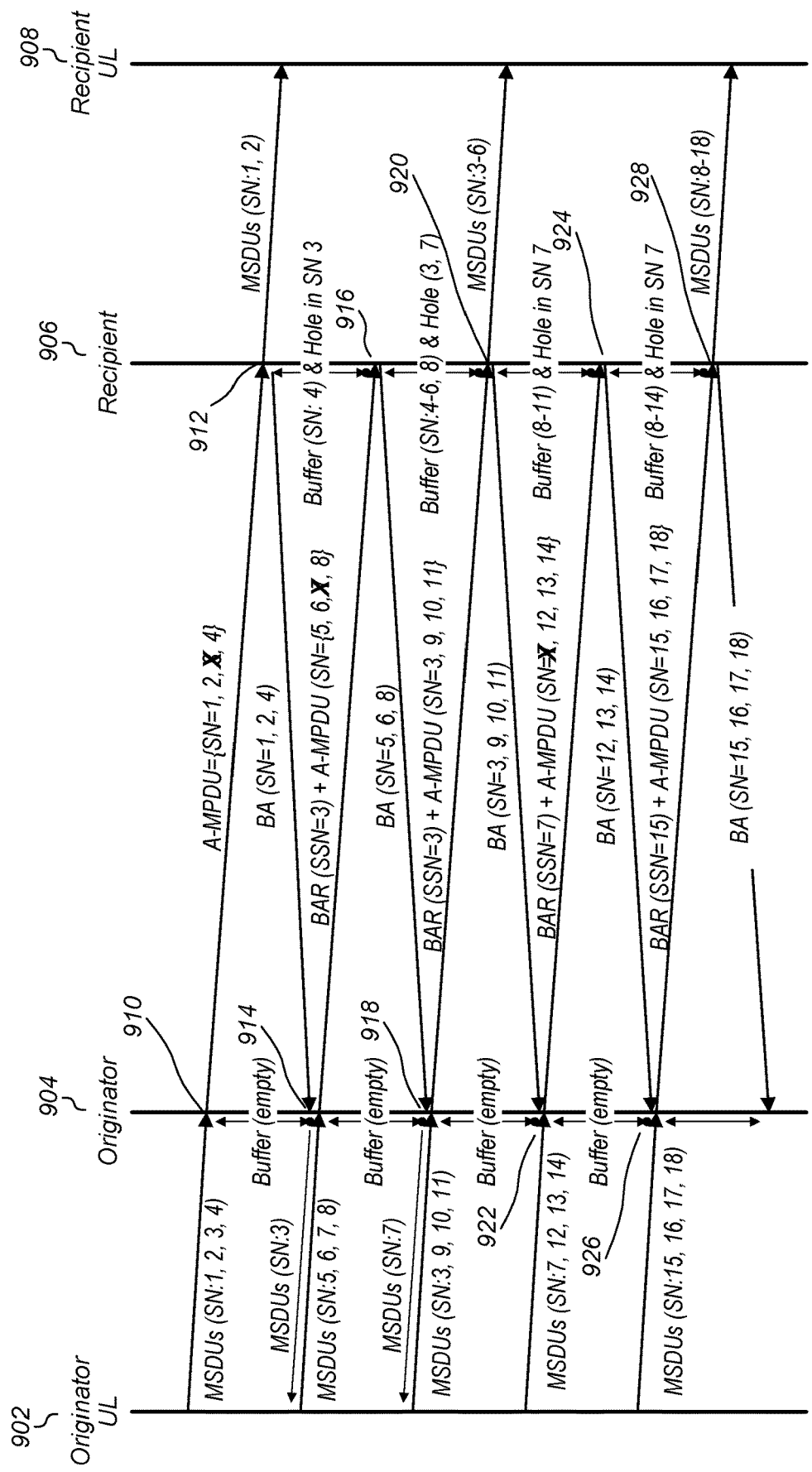

FIGS. 8 and 9—Communication Flow Diagrams Using IO Processing

FIG. 8 is a communication/signal flow diagram illustrating a scheme that may be used for performing block acknowledgements using IO processing, e.g., according to IEEE 802.11 ad/ay, as one possibility. The diagram depicts communication flow between two devices, and further depicts internal communication within each device between a lower layer and an upper layer. Thus, the four illustrated entities represent an upper layer (UL) (e.g., a networking layer or possibly an application layer) of an originator device 802, a lower layer (e.g., a MAC layer) of the originator device 804, a lower layer (e.g., a MAC layer) of the recipient device 806, and a UL (e.g., a networking layer or possibly application layer) of the recipient device 808. Generally, time progresses moving downward in the diagram. Originator UL 802 may pass MSDUs, numbered sequentially (e.g., depicted by label "SN:") to the originator 804. Originator 804 may encapsulate the MSDUs into MPDUs or AMPDUs (e.g., A-MPDUs) for transmission to recipient 806. The recipient 806 may send block acknowledgements (BA) for those MPDUs successfully received by the recipient 806 to the originator 804, may pass sequentially received MSDUs to recipient UL 808, and may store non-sequentially received MPDUs (e.g., including the corresponding encapsulated MSDUs) in its buffer. Originator 804 may also store the MSDUs (e.g., encapsulated in MPDUs) not yet acknowledged in a BA in its buffer until it receives a BA indicating that those MSDUs have been successfully received. Originator 804 may also send block acknowledgement requests (BAR) to recipient 806 (e.g., together with A-MPDU transmissions after an initial A-MPDU transmission, or separately); a BAR may specify a starting SN (SSN) for which a BA is requested. The BAR may also allow originator 804 to flush the recipient's reorder buffer of incomplete MSDUs for which the retransmit lifetime has expired.

In the illustrated example implementation of FIG. 8, there may be one or more rules applied to originating devices (e.g., originator 804). For example, MPDUs that need to be retransmitted may be transmitted first, in sequential order of sequence number, starting from the oldest MPDU that needs to be retransmitted. MPDUs that are being transmitted for the first time may be sent after any MPDUs that need to be retransmitted, in sequential order of sequence number, starting from the oldest MPDU that has not been transmitted.

In some embodiments, a large buffer memory may be needed at originator 804 to hold the MPDUs (which may have yet to be acknowledged, since retransmission may need to be in sequential order, per the rules noted above), in such an implementation. Similarly, a large buffer memory may be needed at the recipient 806 to hold the MPDUs. Additionally, such an implementation may experience relatively high latency, e.g., since complete MSDUs may not immediately be passed to higher layer for processing (e.g., if an in sequential order requirement is imposed).

As specifically illustrated, originator UL 802 may pass MSDUs with SN 1-4 to originator 804 (810). Originator 804 may encapsulate these MSDUs into an AMPDU (with SN 1-4) and transmit the AMPDU to recipient 806 (812); originator 804 may also store these MPDUs in its buffer.

The MPDU with SN=3 may be lost or corrupted in the transmission (e.g., may not be successfully received), so that recipient 806 may receive MPDUs 1, 2, and 4 (814); the recipient 806 may transmit a BA indicating successful receipt of these three SNs to originator 804; and may pass MSDUs 1 and 2 to recipient UL 808. Recipient 808 may not pass MSDU 4 to recipient UL 808 because that MPDU was not received in sequence. Thus, recipient 808 may store MPDU 4 in its buffer.

Originator 804 may delete MPDUs 1, 2, and 4 from its buffer (816) based on receiving the BA, but may retain MPDU 3 because no BA for that SN has been received.

Originator 804 may receive MSDUs (SN: 5-8) and may create an AMPDU with SNs 3 and 5-7 (818). Originator 804 may transmit this AMPDU along with a BAR for SSN 3 to recipient 806. Originator 804's buffer may now include MPDUs with SNs 3 and 5-8.

MPDUs with SNs 3, 5, and 6 may be successfully received by recipient 806 (820), but MPDU with SN 7 may not be successfully received. Thus, recipient 806 may pass MSDUs 3-6 to recipient UL 808, empty its buffer, and transmit a BA for SNs 3, 5, and 6.

Communication may proceed with various MSDUs, MPDUs, BAs, and BARs being transmitted and buffered. Notably, the MPDU with SN 7 may not be successfully received for a second time (822). Based on successfully receiving MPDUs 8-10, recipient 806 may send a BA for these MPDUs and store them in its buffer, but may not send them to recipient UL 808 because they are not in sequential order (e.g., due to missing SN 7). The lifetime of MSDU with SN 7 may eventually expire (824). Accordingly, upon receiving the BA for MPDUs 8-10 and new MSDUs 13-16, originator 804 may transmit an AMPDU with SNs 11-14 and a BAR for SSN 11, thus indicating to recipient 806 that a BA for MSDU 7 is no longer requested. Accordingly, recipient 806 may pass MSDUs 8-14 to recipient UL 808, empty its buffer, and send a BA for SNs 11-14 (826).

FIG. 9 is a communication/signal flow diagram illustrating another scheme that may be used for performing block acknowledgements using IO processing, e.g., according to IEEE 802.11 ay, as another possibility. The diagram depicts communication flow between two devices, and further depicts internal communication within each device between a lower layer and an upper layer. Thus, the four illustrated entities are an upper layer (UL) (e.g., a networking layer or possibly an application layer) of an originator device 902, a lower layer (e.g., a MAC layer) of the originator device 904, a lower layer (e.g., a MAC layer) of the recipient device 906, and a UL (e.g., a networking layer or possibly an application layer) of the recipient device 908. Generally, time progresses moving downward in the diagram. Originator UL 902 may pass MSDUs, numbered sequentially (e.g., depicted by label "SN:") to the originator 904. Originator 904 may encapsulate the MSDUs into MPDUs or AMPDUs (e.g., A-MPDUs) for transmission to recipient 906. The recipient 906 may send block acknowledgements (BA) for those MPDUs successfully received by the recipient 906 to the originator 904, may pass sequentially received MSDUs to recipient UL 908, and may store non-sequentially received MPDUs (e.g., including the corresponding encapsulated MSDUs) in its buffer. Originator 904 may also store the MSDUs (e.g., encapsulated in MPDUs) not yet acknowledged in a BA in its buffer until it receives a BA indicating that those MSDUs have been successfully received. Originator 904 may also send block acknowledgement requests (BAR) to recipient 906.

In this example, the following rules may apply to the Originator 904. Originator 904 may send retransmitted MPDUs NOT in sequential order of sequence number. Originator 904 may send MPDUs NOT in sequential order of sequence number.

A noteworthy difference between FIG. 9 and FIG. 8 may be that sent packets are not held in the buffer of originator 904 (e.g., unlike originator 804). Thus, in comparison to FIG. 8, this exemplary system may use (or allocate) a smaller buffer at 904, but may incur additional (e.g., potentially substantial) latency because of the need to fetch missing MSDUs from originator UL 902. Originator 904 may still require a buffer (e.g., to create AMPDUs). Also, a large buffer memory may be needed at the recipient 906 to hold the MPDUs (e.g., which it may not pass to recipient UL 908 due to an in sequential order requirement) and thus may increase the overall latency further.

As illustrated, originator 904 may receive MSDUs 1-4, encapsulate these into an AMPDU, transmit the AMPDU, and empty its buffer (910). The recipient 906 may receive MPDUs with SN 1, 2, and 4, and may not successfully receive an MPDU with SN 3 (912). Accordingly, recipient 906 may pass MSDUs 1 and 2 to recipient UL 908, hold MPDU 4 in its buffer, and transmit a BA for SNs 1, 2, and 4.

Originator 904 may request MSDU 3 from originator UL 902, receive MSDUs 5-8, create and transmit an AMPDU with SNs 5-8, and transmit a BAR for SSN 3 (914). Recipient 906 may successfully receive MPDUs 5, 6, and 8, but not 7 (916). Thus, recipient 906 may add MPDUs 5, 6, and 8 to its buffer (where 4 still remains), and transmit a BA for SNs 5, 6, and 8. Recipient 906 may not pass any MSDUs to recipient UL 908 because it does not have the next in-order MSDU (e.g., SN 3).

Originator 904 may receive MSDUs 3, and 9-11 from originator UL 902, receive the BA for 5, 6, and 8, transmit a BAR for SSN 3, and create and transmit an AMPDU with SNs 3, 9, 10, and 11 (918). It may empty its buffer. Recipient 906 may receive the BAR for SSN 3 and AMPDU with SNs 3 and 9-11, pass MSDUs 3-6 (e.g., 7 has not been received and so 8-11 may not be next in order) to recipient UL 908, and transmit a BA for SNs 3 and 9-11 (920).

Originator 904 may receive MSDUs 7 and 12-14, receive the BA for 3 and 9-11, transmit a BAR for SSN 7, and create and transmit an AMPDU with SNs 7 and 12-14 (922). Then, recipient 906 may receive MPDUs 12-14, not receive MPDU 7, reply with a BA for SNs 12-14, and retain MPDUs 8-14 in its buffer (924).

The lifetime for MSDU 7 may expire (926) and originator 904 may receive the BA for 12-14, receive MSDUs 15-18, transmit a BAR for SSN 15 (e.g., because MSDU 7 has expired and implicitly indicating that SN 7 will not be sent), and create and transmit an AMPDU (SNs 15-18). Recipient 906, may receive MPDUs 15-18, pass MSDUs 8-18 to recipient UL 908 (e.g., disregarding MSDU 7 on the basis of BAR for SSN 15 rather than for SSN 7), transmit a BA for SNs 15-18, and empty its buffer (928).

Figure 10:
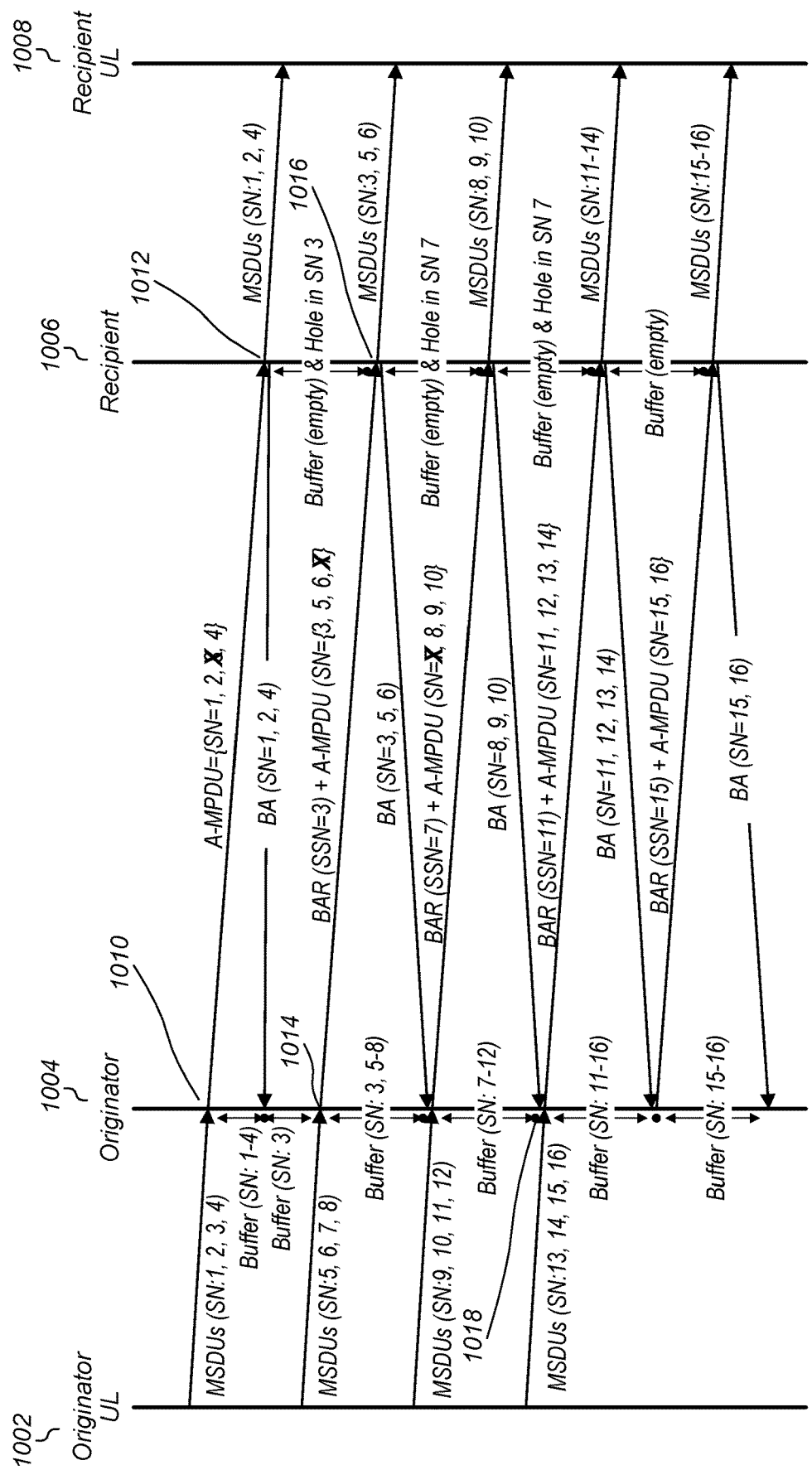
Figure 11:
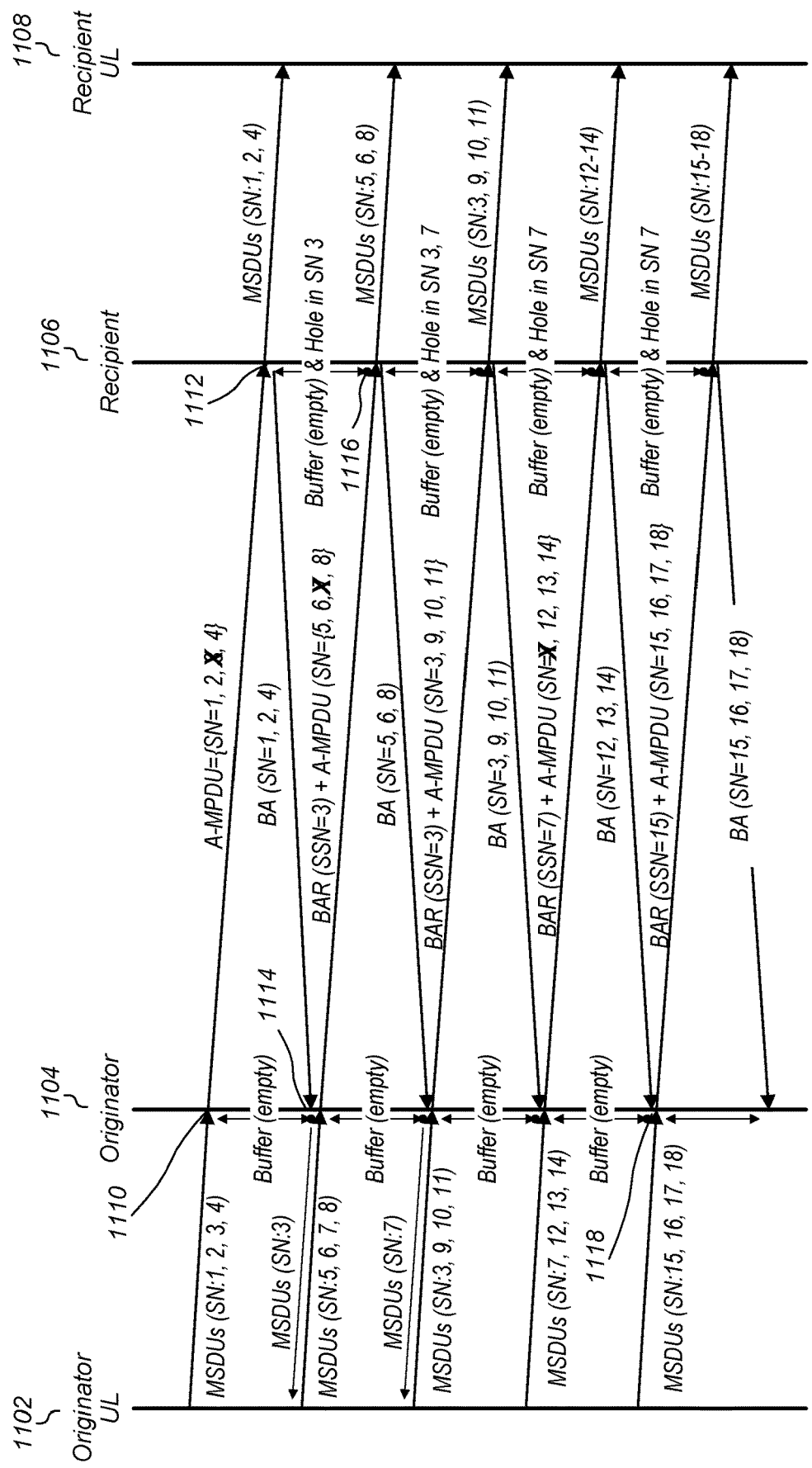

FIGS. 10 and 11—Communication Flow Diagrams Using OOO Processing

FIG. 10 is a communication/signal flow diagram illustrating a scheme that may be used for performing block acknowledgements using OOO processing, e.g., according to IEEE 802.11 ad/ay, as one possibility. Similar to FIGS. 8 and 9, the diagram depicts communication flow between two devices, and further depicts internal communication within each device between a lower layer and an upper layer, such that the following entities are illustrated: originator UL 1002, a lower layer (e.g., a MAC layer) of the originator 1004, a lower layer of a recipient 1006, and a recipient UL 1008. Generally, time progresses moving downward in the diagram.

Relative to the IO processing examples (e.g., FIGS. 8 and 9), a smaller buffer may be used at the recipient 1006. Further, if a specific MPDU is missing (e.g. SN=3 or 7), the recipient 1006 may pass the other complete MSDUs to the upper layer (e.g., recipient UL 1008) for processing. Lower latency may thus be observed, at least in some instances.

As illustrated, originator 1004 may receive MSDUs 1-4, may create and transmit an AMPDU (SNs 1-4), and may store MPDUs 1-4 in its buffer (1010). Recipient 1006 may receive MPDUs 1, 2, and 4; pass MSDUs 1, 2, and 4, to recipient UL 1008; transmit a BA (SNs 1, 2, and 4); and may empty its buffer (1012).

Originator 1004 may receive MSDUs 5-8, create and transmit an AMPDU (SNs 3, 5-7), transmit a BAR for SSN 3, and retain MPDUs 3 and 5-8 in its buffer (1014). Recipient 1006 may receive MPDUs 3, 5, and 6; pass MSDUs 3, 5, and 6 to recipient UL 1008; transmit a BA for SNs 3, 5, and 6; and empty its buffer (1016).

Communication may proceed with various MSDUs, MPDUs, BAs, and BARs being transmitted and buffered. Notably, the lifetime of MSDU 7 may eventually expire (1018). Also, originator 1004 may receive MSDUs 13-16; create and transmit an AMPDU (SNs 11-14); transmit a BAR for SSN 11 (e.g., not for 7 due to the expired lifetime of that packet); and may retain MPDUs 11-16 in its buffer.

FIG. 11 is a communication/signal flow diagram illustrating another scheme that may be used for performing block acknowledgements using OOO processing, e.g., according to IEEE 802.11 ay, as another possibility. Similar to FIGS. 8-10, the diagram depicts communication flow between two devices, and further depicts internal communication within each device between a lower layer and an upper layer, such that the following entities are illustrated: originator UL 1102, a lower layer (e.g., a MAC layer) of the originator 1104, a lower layer of a recipient 1106, and a recipient UL 1108. Generally, time progresses moving downward in the diagram.

Relative to the IO processing examples (e.g., FIGS. 8 and 9), both the originator 1104 and recipient 1106 MAC layers may use (or allocate) smaller buffers. Observed latency may be lower since MSDUs may not be held at the recipient 1106's buffer, at least in some instances. Observed performance may be maintained if the application (e.g., recipient UL 1108) is able to do post processing to compensate for any missing MSDU.

As illustrated, originator 1104 may receive MSDUs 1-4, may create and transmit an AMPDU (SNs 1-4), and may empty its buffer (1110). Recipient 1106 may receive MPDUs 1, 2, and 4; pass MSDUs 1, 2, and 4 to recipient UL 1108; transmit a BA (SNs 1, 2, and 4); and may empty its buffer (1112).

Originator 1104 may receive MSDUs 5-8, create and transmit an AMPDU (SNs 5-8), transmit a BAR for SSN 3, and request MSDU 3 from originator UL 1102, and empty its buffer (1114). Recipient 1106 may receive MPDUs 5, 6, and 8; pass MSDUs 5, 6, and 8 to recipient UL 1108; transmit a BA for SNs 5, 6, and 8; and empty its buffer (1116).

Communication may proceed with various MSDUs, MPDUs, BAs, and BARs being transmitted and buffered. Notably, the lifetime of MSDU 7 may eventually expire (1118). Also, originator 1104 may receive MSDUs 15-18; create and transmit an AMPDU (SNs 15-18); transmit a BAR for SSN 15 (e.g., not for 7 due to the expired lifetime of that packet); and may empty its buffer.

Figure 12:
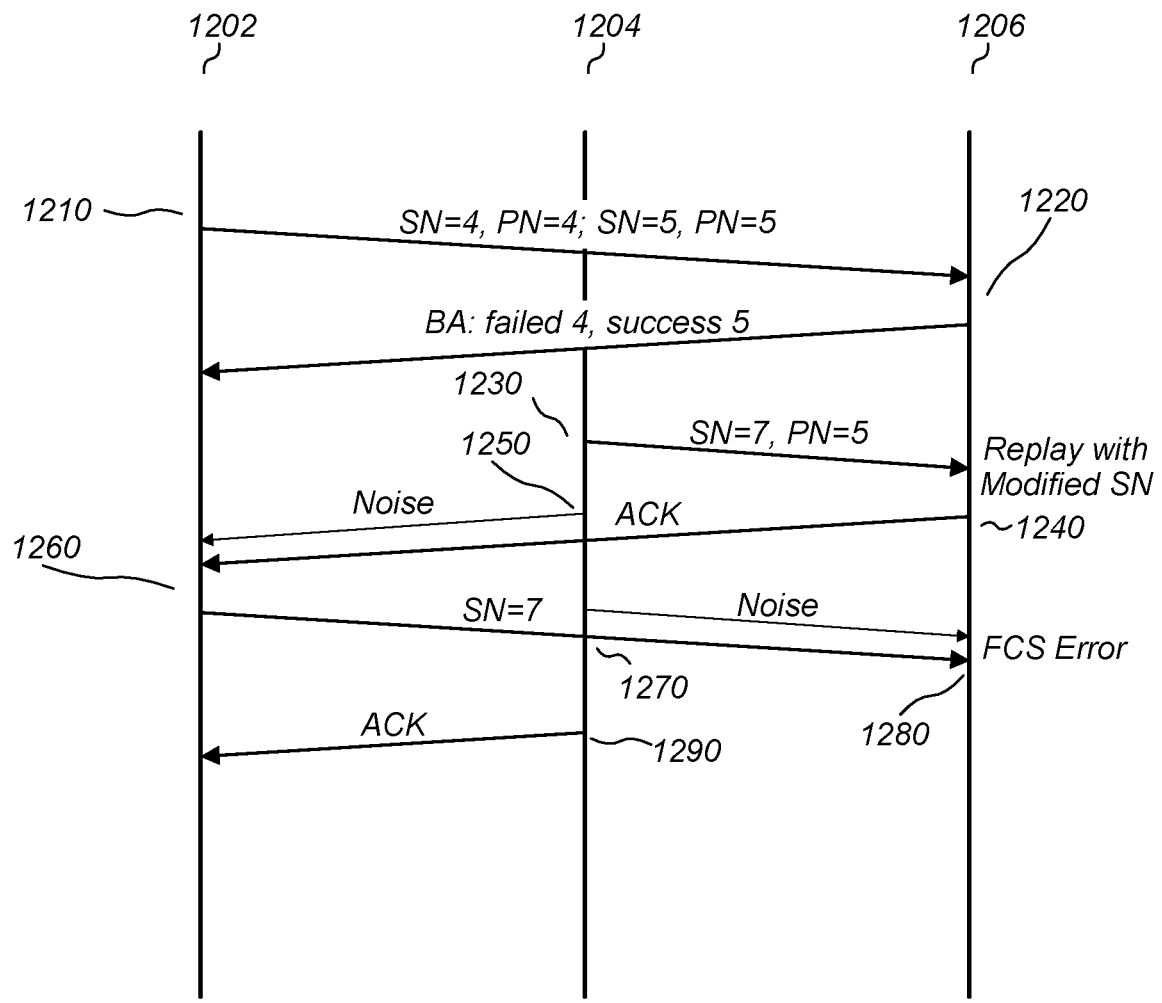
FIG. 12 illustrates an exemplary possible replay attack scenario.

FIG. 12—Replay Attack Scenario

FIG. 12 is a communication/signal flow diagram illustrating a possible replay attack scenario. The diagram illustrates three devices (which may be any of various types of wireless devices, e.g., 102, 106, 300, etc.) in communication. Devices 1202 and 1206 may intend to communicate with each other. However, man-in-the-middle device 1204 may interfere with the intended communications.

At 1210, device 1202 may transmit packets with SNs 4 and 5 to device 1206. The packets may have PNs 4 and 5 respectively. The link may be encrypted and authenticated. Device 1206 may, at 1220, receive SN 5, but SN 4 may fail. Device 1206 may accordingly transmit a BA acknowledging receipt of SN 5, but not 4.

In such a scenario, with an IO approach, the packet with SN 4 may be buffered by device 1202, while device 1206 waits for SN #4, keeping the last PN successfully received in order.

In such a scenario, with an OOO approach, keeping the last in-order received PN may fail for replay on packets with higher SNs. Until ordering is resolved, packets may have received duplicated PNs.

For example, at 1230, the man-in-the-middle device 1204 may resend (e.g., replay) packet #5, but replacing SN=5 to SN=7. Thus, the SN field may not be authenticated. SN=7 may not have been received before by device 1206. Device 1206 may process the packet at 1240 and may attempt to detect the replay by inspecting received PNs for packet #5, although packet #4 may not have been received yet. Device 1206 may transmit an acknowledgement (e.g., an ACK) for SN 7.

At 1250, man-in-the-middle device 1204 may interfere with the ACK by transmitting noise. Device 1202 may not successfully receive the ACK (e.g., due to the noise), and, at 1260, may transmit an additional packet with SN 7.

Again, at 1270, man-in-the-middle device 1204 may interfere with the packet by transmitting noise. As a result, at 1280, device 1206 may experience a frame check sequence (FCS) error. At 1290, man-in-the-middle device 1204 may further interfere by transmitting an ACK (e.g., for SN 7) on behalf of device 1206.

Accordingly, to help detect and mitigate such a possible attack, in some embodiments, PNs may be generated in increasing order, but not necessarily increasing by 1 between two adjacent packets.

Figure 13:
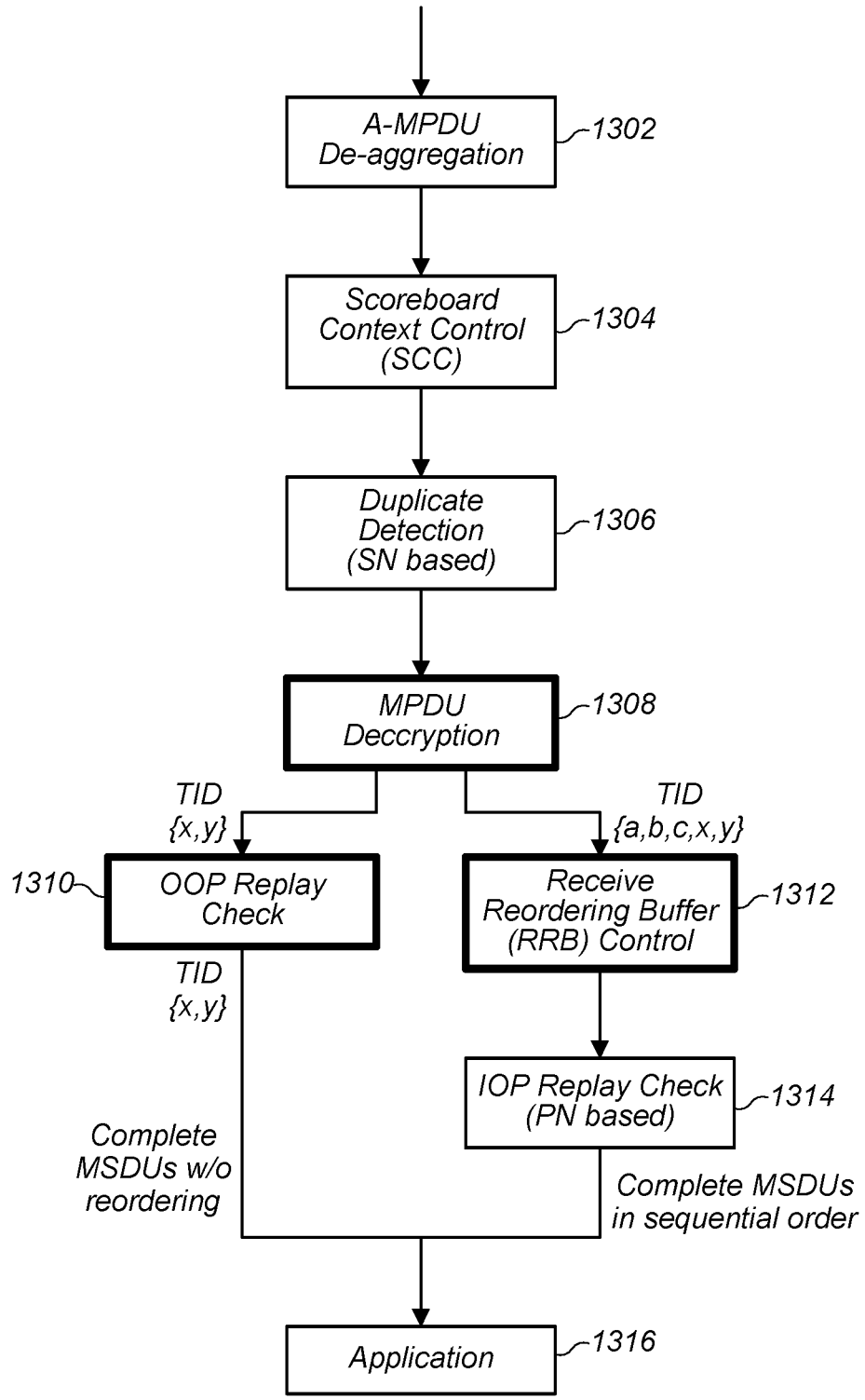
FIGS. 13-14 illustrate exemplary possible schemes for out-of-order packet processing.
Figure 14:
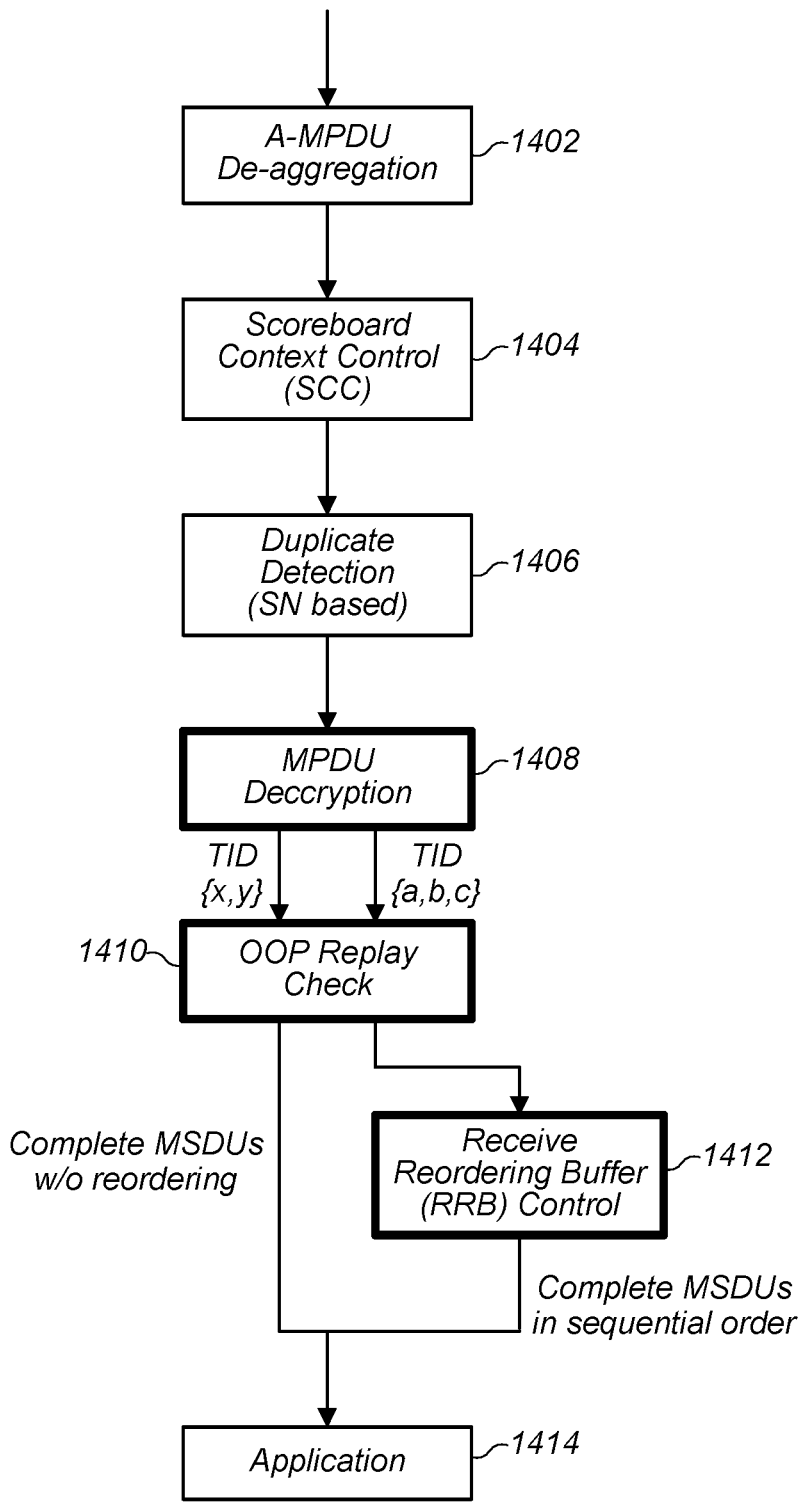

FIGS. 13-14—Recipient Architectures with OOP

FIG. 13 is a flow chart diagram illustrating a scheme that may be used for performing block acknowledgements with OOO processing, according to some embodiments. The scheme may be implemented by a receiving device, which may be any of various types of wireless devices, e.g., 102, 106, 300, etc.) configured to receive packets from another device. The scheme may be implemented in association with IEEE 802.11 standards, as one possibility.

An incoming AMPDU may be de-aggregated into individual MPDUs (1302). The receiving device may track information from the received MPDUs (e.g., PN and/or SN values) in a scoreboard (e.g., scoreboard context control or SCC) (1304). The receiving device may attempt to detect duplicate packets using the SN of the received packets, e.g., in comparison to information stored in the SCC (1306). Detected duplicated packets may be discarded.

The receiving device may decrypt received MPDUs (1308). The decryption may include separating the encrypted MPDU into component parts and reconstituting plaintext data. Following decryption, MPDUs may be sorted into tracks based on TIDs, e.g., to determine which MPDUs are processed by an OOP replay check and which are processed by an IOP Replay check.

MPDUs with TIDs designated for use with OOP (e.g., TIDs x and y) may proceed to an OOP replay check (1310). The OOP replay check may operate according to the methods described herein, or according to any other desired OOP replay check technique. Detected replayed packets may be discarded. Complete MSDUs that pass the OOP replay check may be passed on to an upper layer of the device, e.g., to an application executing on the device (1316). These complete MSDUs may not be reordered prior to being passed to the application.

MPDUs with TIDs designated for use with IOP (e.g., TIDs a, b, and c) may proceed to receive reordering buffer (RRB) control (1312) following decryption. Alternatively, for example if the transmitter that provided the MPDUs was not capable or configured to support OOO packet processing, all MPDUs (e.g., TIDs a, b, c, x, and y, as illustrated) may be provided to RRB control following decryption. The RRB may hold packets in the buffer until all earlier (e.g., lower SN) packets are successfully received. These MPDUs may proceed to an IOP replay check (1314). The IOP replay check may use PNs to identify any replayed packets among the in-order MPDUs. Detected replayed packets may be discarded. Complete MSDUs in order by SN may then be passed to the upper layer (1316).

FIG. 14 is a flow chart diagram illustrating another possible scheme that may be used for performing block acknowledgements with OOO processing, according to some embodiments. The scheme may be implemented by a receiving device, which may be any of various types of wireless devices, e.g., 102, 106, 300, etc.) configured to receive packets from another device. The scheme may be implemented in association with IEEE 802.11 standards, as one possibility.

Similar to FIG. 13, received packets may be de-aggregated (1402), added to the scoreboard (1404), screened for duplicates (1406), and decrypted (1408). Following decryption, MPDUs may be sorted into tracks based on TIDs.

In contrast to the scheme shown in FIG. 13, all packets (e.g., regardless of TID) may proceed to an OOP replay check (1410). The OOP replay check may operate according to the methods described herein, or according to any other desired OOP replay check technique. Detected replayed packets may be discarded.

Complete MSDUs that pass the OOP replay check and have TIDs designated for OOP (e.g., TIDs x and y) may be passed on to an upper layer of the device, e.g., to an application executing on the device (1414). These complete MSDUs may be passed to the application without reordering.

MSDUs with TIDs designated for IOP that pass the OOP replay check may proceed to an RRB control 1412. The RRB may hold packets in the buffer until all earlier (e.g., lower SN) packets are successfully received for the IOP TID(s). Complete MSDUs may be passed to the upper layer (1414) when they are in sequential order.

Figure 15:
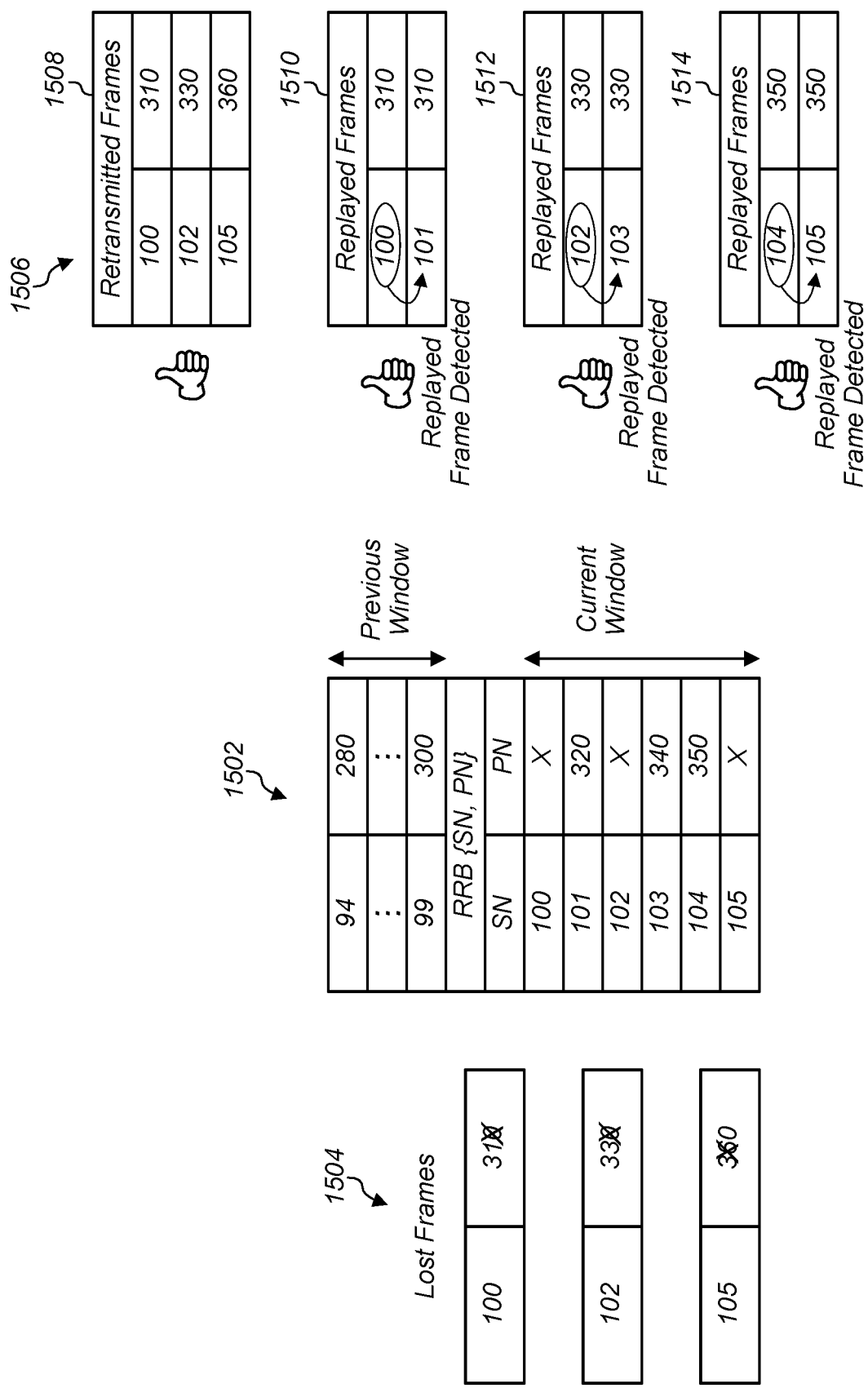
FIG. 15 illustrates exemplary aspects of possible techniques for detection of duplicated and replayed frames.

FIG. 15—OOO Packet Processing Mechanisms

FIG. 15 illustrates possible scenarios for detecting retransmitted, replayed, or duplicate frames with OOO processing, according to some embodiments. Note that the specific SNs, PNs, etc. illustrated are purely illustrative; other combinations and relations between frames are possible.

Table 1502 shows {SN, PN} pairs for several frames, ordered by SN in an RRB. In the current window, frames 100, 102, and 105 may not be received correctly (e.g., for any of various reasons). These lost frames are highlighted in 1504.

Tables 1506 illustrate various possibilities for receiving and/or detecting retransmitted, duplicate, or replayed frames.

Table 1508 illustrates successful reception of retransmitted frames 100, 102, and 105. As illustrated, these retransmitted frames may have exactly the same {SN, PN} pairs as the original, lost frames. Since the retransmitted frames 100, 102, and 105 had not been previously successfully received, and may pass a packet replay check, these frames may be determined to be valid by the receiving device.

Note, however, that in an alternate scenario in which the receiving device had already received one of these frames, but that frame was nonetheless retransmitted (e.g., if no acknowledgement frame for that frame was received by the transmitter), that frame may be considered a duplicate frame. In such a case, the receiving device may be able to detect and discard the duplicate frame, e.g., based on having previously successfully received a valid frame with an identical sequence number.

Tables 1510, 1512, and 1514 illustrate possible detection of replayed frames. In particular, in table 1510, a frame with SN 100 may be determined to be a valid frame, e.g., based on a packet replay check (e.g., as indicated by the thumbs up symbol), but a replayed frame with SN 101 may be detected, e.g., based at least in part on having a PN 310 that is identical to the PN 310 of the valid frame with SN 100. Similarly, in table 1512, a frame with SN 103 may be a replayed frame that can be detected based on having the identical PN 330 as a (valid) frame with SN 102. In table 1514, a frame with SN 105 may be a replayed frame that can be detected based on having the identical PN 350 as a (valid) frame with SN 104.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a STA) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. An apparatus, comprising a processing element configured to cause a first wireless device to:
   at a media access control (MAC) layer of the first wireless device:
      receive a plurality of first MAC protocol data units (MPDUs) from a second wireless device, wherein the plurality of first MPDUs comprise a plurality of first MAC service data units (MSDUs);
      perform an out-of-order replay check for the plurality of first MSDUs, wherein any replayed MSDUs are discarded; and
      provide, subsequent to the out-of-order replay check, to a network layer above the MAC layer of the first wireless device, the plurality of first MSDUs excluding any replayed MSDUs in a non-sequential sequence number order without reordering the plurality of first MSDUs or holding the plurality of first MSDUs in a reordering buffer.

2. The apparatus of claim 1, wherein the plurality of first MPDUs are received in one or more aggregated MPDUs (A-MPDUs).

3. The apparatus of claim 2, wherein the processing element is further configured to cause the MAC layer of the first wireless device to:
   determine a sequence number for each MPDU of the plurality of first MPDUs that is successfully received by the first wireless device; and
   provide a block acknowledgement to the second wireless device in response to each respective A-MPDU received by the first wireless device, wherein the block acknowledgement indicates the sequence number for each MPDU of the respective A-MPDU that is successfully received by the first wireless device.

4. The apparatus of claim 1, wherein the processing element is further configured to cause the MAC layer of the first wireless device to:
   receive an indication of a traffic identifier for the plurality of first MPDUs,
   wherein providing the plurality of first MSDUs to the network layer of the first wireless device in a non-sequential sequence number order is based at least in part on the traffic identifier for the plurality of first MPDUs.

5. The apparatus of claim 4, wherein the processing element is further configured to cause the MAC layer of the first wireless device to:
   receive an indication of a second traffic identifier for a plurality of second MPDUs received by the first wireless device from the second wireless device, wherein the second traffic identifier for the plurality of second MPDUs is different than the traffic identifier for the plurality of first MPDUs, and
   provide a plurality of second MSDUs included in the plurality of second MPDUs to the network layer of the first wireless device in a sequential sequence number order based at least in part on the second traffic identifier for the plurality of second MPDUs.

6. The apparatus of claim 1, wherein the processing element is further configured to cause the MAC layer of the first wireless device to:
   negotiate with the second wireless device to determine one or more traffic identifiers for which out-of-order packet processing is configured.

7. A wireless device, comprising:
   an antenna;
   a radio communicatively coupled to the antenna; and
   a processing element communicatively coupled to the radio;
   wherein the antenna, radio, and processing element are configured to:
      receive, from a second device, one or more Media Access Control (MAC) Protocol Data Units (MPDUs), wherein the one or more MPDUs include one or more MAC Service Data Units (MSDUs) and a traffic identifier;
      determine a sequence number for each of the one or more MPDUs;
      determine that at least one other MPDU was not successfully received by the wireless device based at least in part on the sequence numbers for each of the one or more MPDUs;
      perform an Out-of-Order Packet (OOP) Replay Check, wherein any replayed MSDUs are discarded; and
      in response to the OOP Replay Check, pass, from a MAC layer to a network layer of the wireless device, at least one MSDU excluding any replayed MSDUs associated with a first MPDU of the one or more MPDUs having a higher sequence number than the at least one other MPDU prior to receiving the other MPDU and without holding the first MPDU in a reordering buffer.

8. The wireless device of claim 7, wherein the wireless device is further configured to:

communicate with the second device to complete a setup phase, wherein completing the setup phase comprises negotiating one or more traffic identifiers associated with Out-of-Order (OOO) processing.

9. The wireless device of claim 8, wherein completing the setup phase further comprises negotiating one or more of:
a block acknowledgement policy;
a traffic identifier associated with In-Order (IO) processing;
a buffer size; or
a starting sequence number (SSN).

10. The wireless device of claim 7, wherein the wireless device is further configured to:
perform decryption of the one or more MPDUs; and
select a type of replay check of a plurality of types of replay check, wherein the plurality of types of replay check includes the OOP Replay Check and an In-Order Packet (IOP) Replay Check based at least in part on the traffic identifier for the one or more MPDUs, wherein a replay check provides for detection of duplicate packets.

11. The wireless device of claim 10, wherein performing decryption of the one or more MPDUs comprises constructing additional authenticated data for each MPDU, wherein the additional authenticated data for a respective MPDU is based on the sequence number for the respective MPDU.

12. The wireless device of claim 7, wherein to perform the OOP Replay Check, the wireless device is further configured to:
initialize an array of ordered pairs of sequence numbers and packet numbers, wherein each packet number of the array is initialized to a configured maximum packet number value; and
for each MPDU:
determine whether the MPDU is a valid packet, wherein the MPDU is determined to not be a valid packet when the packet number of the MPDU is less than or equal to a packet number paired with a sequence number associated with the MPDU in the array, and when the packet number paired with the sequence number associated with the MPDU in the array is less than the maximum packet number value; and
set the packet number paired with the sequence number of the MPDU in the array to the packet number of the MPDU when it is determined that the MPDU is a replayed packet.

13. A method for processing received packets at a wireless device, comprising:
at a Media Access Control (MAC) layer or a lower layer, below the MAC layer, of the wireless device:
receiving a plurality of packets, wherein the plurality of packets is received in a received order;
determining identifying information for each of the plurality of packets;
determining, based at least in part on the identifying information, that the received order of the plurality of packets is not the same as a sent order of the plurality of packets;
performing an out-of-order replay check, wherein any replayed packets of the plurality of packets are discarded; and
based on the out-of-order replay check, providing payload information from the plurality of packets excluding any replayed packets to a network layer of the wireless device in the received order without holding the payload information in a reordering buffer.

14. The method of claim 13, wherein the identifying information for each respective packet of the plurality of packets comprises a sequence number for the respective packet and a packet number for the respective packet.

15. The method of claim 14, further comprising:
decrypting one or more of the plurality of packets, wherein performing the out-of-order replay check is based at least in part on the decrypted one or more of the plurality of packets.

16. The method of claim 15, wherein performing an out-of-order replay check for a packet comprises one of:
performing a range search in sequential order to determine whether the packet is a valid packet, or
performing a brute-force search in sequential order to determine whether the packet is a valid packet.

17. The method of claim 16, wherein performing the range search in sequential order to determine whether the packet is a valid packet comprises:
arranging in ascending order, by sequence number, ordered pairs of sequence number and packet number for previously received valid packets;
determining at least one sequence number range and packet number range pair to search to determine whether the packet is a valid packet;
for each determined sequence number range and packet number range pair, determining if the sequence number of the packet is in the sequence number range and if the packet number of the packet is in the packet number range;
determining that the packet is a valid packet when the sequence number of the packet is in the sequence number range and the packet number of the packet is in the packet number range for at least one determined sequence number range and packet number range pair; and
determining that the packet is not a valid packet when there is no determined sequence number range and packet number range pair for which the sequence number of the packet is in the sequence number range and the packet number of the packet is in the packet number range.

18. The method of claim 16, wherein performing the range search in sequential order to determine whether the packet is a valid packet comprises:
determining that the packet is a valid packet when the sequence number of the packet is not the same as any sequence number of a previously received valid packet in a current window and when a packet number of the packet is both greater than a packet number corresponding to a largest sequence number in the current window that is smaller than the sequence number of the packet and less than a packet number corresponding to a smallest sequence number in the current window that is larger than the sequence number of the packet; and
determining that the packet is not a valid packet when the sequence number of the packet is the same as a sequence number of any previously received valid packet or when the packet number of the packet is not both greater than the packet number corresponding to the largest sequence number in the current window that is smaller than the sequence number of the packet and less than the packet number corresponding to the smallest sequence number in the current window that is larger than the sequence number of the packet.

19. The method of claim 16, wherein performing the brute-force search in sequential order to determine whether the packet is a valid packet comprises:

arranging ordered pairs of sequence number and packet number for previously received valid packets in ascending order by sequence number;

determining that the packet is a valid packet when the sequence number of the packet is different from a sequence number of every previously received valid packet within a current window and when a packet number of the packet is different from a packet number of every previously received valid packet within the current window; and determining that the packet is not a valid packet when the sequence number of the packet is the same as a sequence number of any previously received valid packet within the current window or when a packet number of the packet is the same as a packet number of any previously received valid packet within the current window.

20. The method of claim 13, further comprising:

transmitting a block acknowledgement to a second device indicating that the wireless device has received the plurality of packets.

* * * * *